United States Patent
Lim et al.

(10) Patent No.: US 12,536,093 B2
(45) Date of Patent: Jan. 27, 2026

(54) SYSTEMS AND METHODS FOR PROVIDING A TIMELINE VIEW OF LOG INFORMATION FOR A CLIENT APPLICATION

(71) Applicant: Bitdrift, Inc., San Francisco, CA (US)

(72) Inventors: Brendan Gonzales Lim, San Jose, CA (US); Taggart C. Matthiesen, Kentfield, CA (US); Vicky Li, San Francisco, CA (US); Martin Conte MacDonell, San Jose, CA (US); Matthew David Klein, Boise, ID (US); Miguel Angel Juarez Lopez, Brooklyn, NY (US)

(73) Assignee: Bitdrift, Inc., San Francisco, CA (US)

( * ) Notice: Subject to any disclaimer, the term of this patent is extended or adjusted under 35 U.S.C. 154(b) by 6 days.

(21) Appl. No.: 17/977,916

(22) Filed: Oct. 31, 2022

(65) Prior Publication Data
US 2024/0143482 A1    May 2, 2024

(51) Int. Cl.
*G06F 11/3604* (2025.01)
*G06F 11/07* (2006.01)

(52) U.S. Cl.
CPC ...... *G06F 11/3612* (2013.01); *G06F 11/0775* (2013.01); *G06F 11/0781* (2013.01)

(58) Field of Classification Search
CPC ............ G06F 11/3612; G06F 11/0775; G06F 11/0781; G06F 11/362; G06F 11/34; G06F 11/30; G06F 11/07
USPC ........................................................ 717/124
See application file for complete search history.

(56) References Cited

U.S. PATENT DOCUMENTS

| 2006/0150163 A1* | 7/2006 | Chandane ........... G06F 11/3612 717/131 |
| 2006/0224579 A1 | 10/2006 | Zheng |
| 2013/0086587 A1* | 4/2013 | Naik ................... G06F 11/0781 718/100 |
| 2015/0032884 A1* | 1/2015 | Greifeneder ........ G06F 11/3419 709/224 |

(Continued)

FOREIGN PATENT DOCUMENTS

| CN | 110245208 A | 9/2019 |
| CN | 112579552 A | 3/2021 |

(Continued)

OTHER PUBLICATIONS

Ye, WO 2018014492 A1, Published Jan. 25, 2018, "Method and Device for Viewing Operation Records of Mobileterminal", English translation copy of Foreign Patent Document WO-2018014492-A1, pp. 1-13, (Year: 2018).*

(Continued)

*Primary Examiner* — Bradley A Teets
*Assistant Examiner* — Zengpu Wei
(74) *Attorney, Agent, or Firm* — Lee Sullivan Shea & Smith LLP

(57) ABSTRACT

A computing platform may be configured with technology for presenting information about a given runtime session of a given client application in the form of a timeline view comprising a time-sorted listing of line items for log events recorded during the given runtime session, wherein each log event's line item includes (i) timing information, (ii) a textual descriptor log event, and (iii) an indication of one or more contextual values associated with the respective log event.

20 Claims, 10 Drawing Sheets

(56) References Cited

U.S. PATENT DOCUMENTS

| | | | | |
|---|---|---|---|---|
| 2015/0188795 | A1* | 7/2015 | Hoen, IV | G06F 11/3006 |
| | | | | 709/224 |
| 2016/0259709 | A1* | 9/2016 | Anand | G06F 16/248 |
| 2017/0118610 | A1 | 4/2017 | Schieman et al. | |
| 2017/0308456 | A1* | 10/2017 | Barsness | G06F 8/41 |
| 2023/0222028 | A1* | 7/2023 | Liao | G06F 11/0784 |
| | | | | 714/48 |
| 2023/0230300 | A1* | 7/2023 | Yagi | G06F 11/32 |
| | | | | 345/419 |
| 2023/0350782 | A1* | 11/2023 | Sneed | G06F 11/3409 |

FOREIGN PATENT DOCUMENTS

| | | | | |
|---|---|---|---|---|
| KR | 10-2011-0061503 A | 6/2011 | | |
| WO | WO-2017037801 A1 * | 3/2017 | | G06F 11/30 |
| WO | WO-2018014492 A1 * | 1/2018 | | |

OTHER PUBLICATIONS

Yoshiyuki et al., WO 2017037801 A1, Published Mar. 9, 2017, "Monitoring System and Method for Monitoring", English translation copy of Foreign Patent Document WO-2017037801-A1, pp. 1-13, (Year: 2017).*

International Searching Authority. International Search Report and Written Opinion issued in International Application No. PCT/US2023/036499, mailed on Feb. 26, 2024, 6 pages.

Kuć, Rafal. Understanding Logging Levels: What They Are & How To Use Them. Sematext Group [online], [retrieved Jul. 6, 2022], Retrieved from the Internet: <URL:https://sematext.com/blog/logging-levels/>, 6 pages.

* cited by examiner

SYSTEMS AND METHODS FOR PROVIDING A TIMELINE VIEW OF LOG INFORMATION FOR A CLIENT APPLICATION

BACKGROUND

In today's digital age, client applications of all different kinds play an increasing role in peoples' daily lives. For example, users of mobile devices such as smartphones and tablets may use a wide range of different mobile applications (or "mobile apps" for short), examples of which may include lifestyle apps (e.g., ridesharing apps, travel apps, restaurant apps, dating apps, etc.), social media apps, entertainment apps (e.g., music apps, video apps, book apps, etc.), gaming apps, news apps, and/or productivity apps, among many other possible examples. As another example, users of other types of computers such as laptops and desktops may use a wide range of different desktop applications, which may fall into similar categories. As yet another example, users of mobile devices and computers may use a wide range of web applications that run within web browsers on the users' mobile devices and computers. The types of client applications that could be installed and used on mobile devices and/or other computers may take various other forms as well.

In order to release a new client application (or a new version of a client application) to users of mobile devices or other computers, a software provider typically has to engage in a multi-stage process that involves activities such as planning the client application, designing, developing, and building the client application, testing the client application, preparing the client application for release, and then releasing the client application, among other possible activities, which can be time consuming and costly. Moreover, after the software provider releases a client application, issues with the client application often materialize that may give rise to a need for the software provider's personnel to review log information for the released client application. However, the technology that exists today for collecting, reporting, and presenting log information for a released client application has many limitations that inhibit a software provider's ability to identify, diagnose, and address issues with the released client application.

SUMMARY

In one aspect, the disclosed technology may take the form of a method that involves (i) receiving, from a first client device installed with a given client application, (a) log information for a set of log events recorded by the first client device during a given runtime session of the given client application and (b) associated contextual information for the given runtime session of the given client application, (ii) storing the log information and associated contextual information for the given runtime session of the given client application, (iii) receiving, from a second client device, a request to access a timeline view for the given runtime session of the given client application, and after receiving the request: (iv) retrieving at least a subset of the stored log information and associated contextual information for the given runtime session of the given client application, and (v) based on the retrieved subset of the stored log information and associated contextual information for the given runtime session of the given client application, causing the second client device to present the timeline view for the given runtime session of the given client application, the timeline view comprising a time-sorted listing of line items for log events in the set of log events, wherein each respective log event's line item includes at least (a) timing information for the respective log event, (b) a textual descriptor for the respective log event, and (c) an indication of one or more contextual values associated with the respective log event.

In some example embodiments, the indication of the one or more contextual values within each respective log event's line item may comprise an indication of one or more of (i) a networking library being utilized by the given client application when the respective log event was recorded, (ii) a network connection state of the first client device when the respective log event was recorded, or (iii) a state of the given client application when the respective log event was recorded.

Further, in some example embodiments, the indication of the one or more contextual values within each respective log event's line item may comprise a respective icon for each of the one or more contextual values that graphically represents the contextual value. And in such example embodiments, the respective icon for each of the one or more contextual values may be color-coded in accordance with the contextual value being represented.

Further yet, in some example embodiments, the textual descriptor within each respective log event's line item may comprise one or both of (i) a label indicating a category of the respective log event or (ii) a descriptive phrase that provides a preview of the respective log event.

Still further, in some example embodiments, the textual descriptor within each respective log event's line item may be color-coded in accordance with a category of the respective log event.

In some example embodiments, the line items for the log events may also include other information as well. For instance, as one possibility, each respective log event's line item may further include a category icon that graphically represents a category of the respective log event. As another possibility, each respective log event's line item may further include an indication of a severity level of the respective log event. As yet another possibility, at least one respective log event's line item may further include a duration of the respective log event. As still another possibility, at least one respective log event's line item may further include an indication of whether the respective log event resulted in success or failure.

Further, in some example embodiments, the function of causing the second client device to present the timeline view for the given runtime session of the given client application may involve transmitting, to the second client device, a response to the request that comprises instructions and data for constructing the timeline view.

Further yet, in some example embodiments, the method may further involve, after receiving the request, causing the second client device to present a mini-map view along with the timeline view, wherein the mini-map view may comprise a visualization of respective volumes of two or more categories of log events that were recorded during the course of the given runtime session of the given client application.

Still further, in some example embodiments, the log information and associated contextual information are encoded together within a set of log entries.

In another aspect, the disclosed technology may take the form of a computing platform comprising at least one processor, at least one non-transitory computer-readable medium, and program instructions stored on the at least one non-transitory computer-readable medium that are executable by the at least one processor such that the computing platform is configured to carry out the functions of the aforementioned method.

In yet another aspect, the disclosed technology may take the form of a non-transitory computer-readable medium comprising program instructions stored thereon that are executable to cause a computing platform to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1:
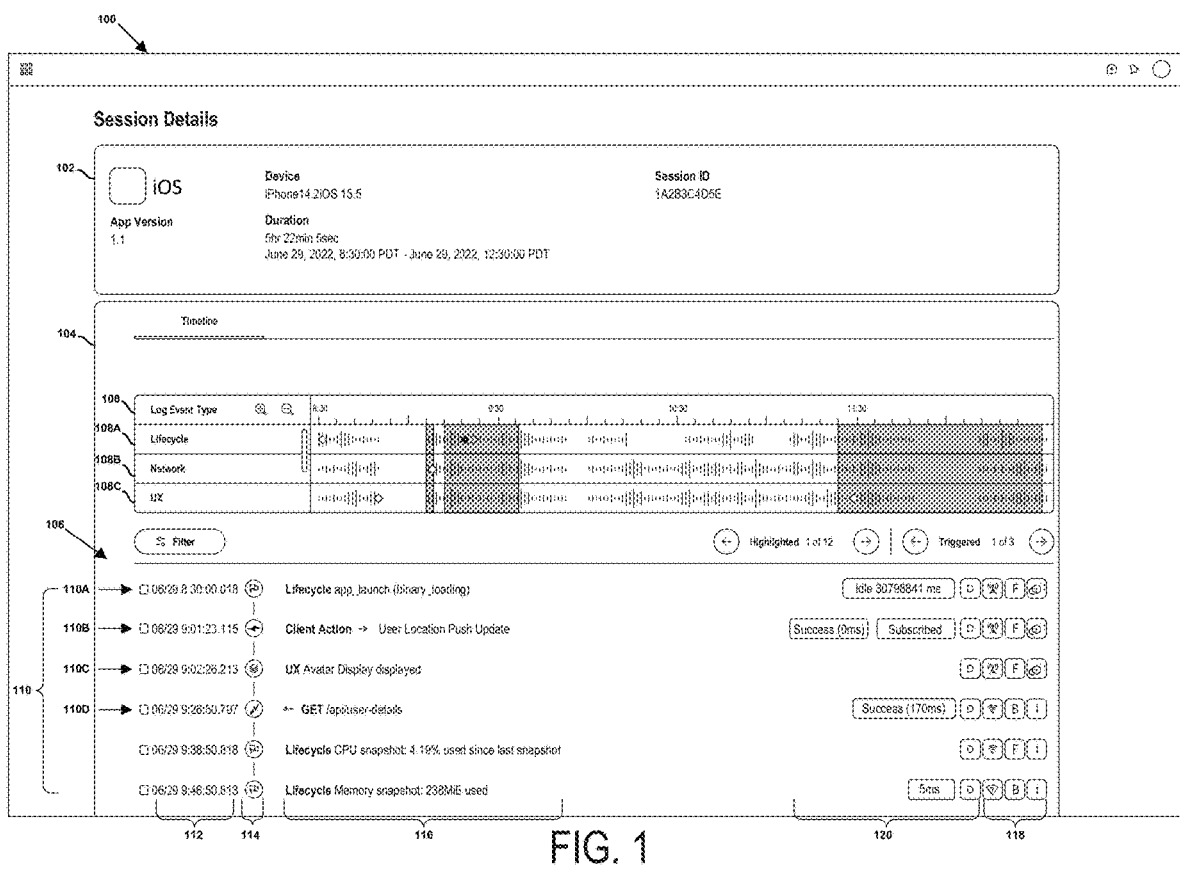
FIG. 1 is a diagram that illustrates one possible example of an example user-interface view that may be presented in accordance with the disclosed technology.

As noted above, client applications of all different kinds play an increasing role in peoples' daily lives. For example, users of mobile devices such as smartphones and tablets may use a wide range of different mobile applications (or "mobile apps" for short), examples of which may include lifestyle apps (e.g., ridesharing apps, travel apps, restaurant apps, dating apps, etc.), social media apps, entertainment apps (e.g., music apps, video apps, book apps, etc.), gaming apps, news apps, and/or productivity apps, among many other possible examples. As another example, users of other types of computers such as laptops and desktops may use a wide range of different desktop applications, which may fall into similar categories. As yet another example, users of mobile devices and computers may use a wide range of web applications that run within web browsers on the users' mobile devices and computers. The types of client applications that could be installed and used on mobile devices and/or other computers may take various other forms as well.

In order to release a new client application (or a new version of a client application) to end users of mobile devices or other computers, a software provider typically has to engage in a multi-stage process that involves activities such as planning the client application, designing, developing, and building the client application, testing the client application, preparing the client application for release, and then releasing the client application, among other possible activities, which can be time consuming and costly. Moreover, after the software provider releases a client application and it starts to get installed and used by end users, issues with the client application often materialize that may give rise to a need for the software provider's personnel (e.g., developers, engineers, analysts, etc.) to review log information for the client application in order to identify, diagnose, and try to resolve the issues.

To facilitate this process, client applications may be designed to collect certain information about runtime sessions of the client application, such as log information that memorializes certain types of log events detected by the client application, and then periodically send the collected information back to the software provider so that it can be reviewed and analyzed by the software provider's personnel. However, the technology that exists today for collecting, reporting, and presenting log information for a client application has many limitations. For instance, client applications today typically only collect and report log information for more severe levels of log events (e.g., WARN, ERROR, and/or FATAL log levels) while foregoing the collection or reporting of log information for less severe levels of log events (e.g., INFO, DEBUG, and TRACE log levels), which limits the software provider's visibility into the performance of the client application because log information for less severe levels of log events may provide still valuable information regarding performance issues that arise during runtime sessions of the client applications. Further, client applications today may not report log information for every runtime session of the client applications. Instead, the client applications today may only report log information for runtime sessions during which certain types of serious events occurred, such as a crash, which means that the software provider's personnel may only be provided with visibility into a small percentage of the runtime sessions for the client application. As a result, the software provider may not have the visibility it needs in order to effectively identify, diagnose, and address performance issues with the client application after it has been released to end users.

To help address these limitations, a client application could be programmed to automatically collect a more complete set of log information during each runtime session of the client application (e.g., a log level setting of TRACE or DEBUG) and then report that more complete set of log information for each runtime session back to the software provider so that it can be reviewed by the software provider's personnel. However, in practice, this approach may result in the client application collecting a very large volume of log information during each runtime session of the client information, such as 5,000-10,000 log entries or more, which may present additional challenges with respect to how this larger volume of log information will be presented to the software provider's personnel for review and analysis. Indeed, without any logical organization or visual guidance, the act of reviewing and analyzing 5,000-10,000 (or more)

log entries in order to extract relevant information about a runtime session of a client application would be very time consuming, cumbersome, and labor intensive, which may negatively impact the productivity of the software provider's personnel and also lead to issues with the client application being overlooked or misdiagnosed.

To address these and other problems, disclosed herein is new software technology for presenting log information that is collected and reported for a runtime session of a client application in a timeline view that enables users (e.g., software provider personnel such as software developers, engineers, analysts, or the like) to review and analyze the log information in a quicker and more efficient way, which may in turn allow such users to more quickly identify, diagnose, and address issues with the client application. This new software technology may be referred to herein as a "session analysis tool."

At a high level, the timeline view that is presented by the disclosed session analysis tool may comprise a time-sorted listing of respective line items for log events that were recorded during a runtime session of a client application, where each log event's respective line item may include at least (i) a timing information for the log event (e.g., a date and time when the log event was recorded by the client application as a log entry) and (ii) a textual descriptor of the log event (e.g., a label indicating a category of the log event and perhaps also certain other descriptive information for the log event) that serves as a truncated representation (or "preview") of the log entry that was recorded for the log event. In at least some implementations, the timeline view may also utilize different icons and/or different coloring for the line items to distinguish between different categories of log events, which may enable a user to more quickly interpret the progression and relationship of log events within the timeline view. For instance, the timeline view could utilize different icons and/or different coloring for the line items to distinguish between different categories of log events, examples of which may include (1) lifecycle events for the client application, such as events related to launching, backgrounding, foregrounding, or terminating the client application, which may be referred to herein as "Lifecycle" log events, (2) client-action events for the client application, such as events related to internal actions taken by the client application, which may be referred to herein as "Client Action" log events, (3) network-call events for the client application, such as events related to the transmission of network requests or the receipt of network responses (among other types of network calls), which may collectively be referred to herein as "Network" log events and may further be differentiated based on the particular type of network action being performed (e.g., the particular type of HTTP method being utilized), and (4) user-interface events for the client application, such as events related to user input received via the client application's user interface and/or updates to the client application's user interface, which may be referred to herein as "UX" log events, among other possible categories of log events may be presented within the timeline view (e.g., other custom types of log events defined by the software provider).

In at least some implementations, the timeline view's time-sorted listing of line items could additionally include line items for other types of events as well, such that the timeline view is capable of presenting different types of events related to a runtime session of the client application that may be aggregated from multiple different sources (e.g., multiple different software processes). For instance, as one possibility, the timeline view's time-sorted listing of line items could additionally include respective line items for certain types of client-side "analytics events," which are additional events related to a runtime session of the client application that are recorded by the client application outside of its logging functionality. These client-side analytics events could take various forms, examples of which may include events related to the state and/or operation of the client application during a runtime session, the state and/or operation of the client device running the client application during a runtime session, or the end-user interaction with the client application during a runtime session, among other possibilities. Further, the logic for detecting these client-side analytics events could take the form of a set of rules that are either hardcoded into the client application prior to release or are executed by a configurable rules engine embedded within the client application, among other possibilities. Further yet, certain types of client-side analytics events may have an associated set of actions that are to be carried out by the client application when the analytics event is detected in order to trigger a change in the logging behavior of the client application, such as by triggering the client application to collect and/or report log information for additional levels of log events. These types of client-side analytics events may be referred to herein as "trigger events."

As another possibility, the timeline view's time-sorted listing of line items could additionally include respective line items for certain types of server-side analytics events, which are events related to a runtime session of the client application that are recorded by the software provider's back-end platform based on an analysis of information about the runtime session that is received from the client application (e.g., log information).

The timeline view's time-sorted listing of line items could additionally include line items for events of other types as well.

Further, as with the respective line items for the log events, the respective line items for these other types of events may each include at least (i) a timing information for the event (e.g., a date and time when the event was recorded) and (ii) a textual descriptor of the event (e.g., a label indicating a category of the event and perhaps also certain other descriptive information for the event) that serves as a truncated representation (or "preview") of the data that was recorded for the event, and the timeline view may optionally utilize different icons and/or different coloring for these line items to distinguish them from line items for log events (and perhaps to distinguish between different types of analytics events).

In accordance with the present disclosure, each event's respective line item within the timeline view may also include certain contextual information associated with the event (e.g., information that provides context regarding the circumstances under which the event was recorded) and is intended to further assist in the review and analysis of the runtime session of the client application. Such contextual information that is presented for an event may comprise values for any of various contextual attributes, including but not limited to attributes related to the state and/or operation of the client application, attributes related to the state and/or operation of the end-user client device running the client application, and/or attributes related to the user's interaction with the end-user client device running the client application, among other possible types of contextual attributes. As some representative examples, such contextual attributes may include (1) an indication of the state of the client application at the time that the event was recorded (e.g., whether the client application was in the background or the foreground), (2) an indication of the network connection state of the end-user client device running the client application (e.g., cellular vs. Wi-Fi vs. no network connectivity) at the time that the event was recorded, and/or (3) an indication of the networking library being utilized by the client application at the time that the event was recorded (e.g., a custom networking library such as the Envoy Mobile library vs. a native networking library such as an Apple iOS library or an Android library, among others), among other possible contextual attributes that may be presented for the event.

The timeline view may also utilize different icons and/or different coloring to distinguish between the different contextual attributes that may be presented for a line item as well as to distinguish between the different contextual values that may be presented for a given contextual attribute across different line items, which may enable a user to more quickly interpret the progression and relationship of events within the timeline view. For instance, the timeline view may utilize different icons and/or different coloring to represent the different contextual values for the application-state contextual attribute (e.g., foreground vs. background) and/or the different contextual values for the network-connection-state contextual attribute (e.g., cellular vs. Wi-Fi vs. no connectivity), among other possibilities, which may enable a user to more quickly identify changes to the contextual value of a given contextual attribute from one event to another while navigating through the timeline view.

Additionally yet, a given event's respective line item could include certain additional details regarding the event. For example, each log event's respective line item may include an indication of a severity level of the log event (e.g., TRACE, DEBUG, INFO, WARN, ERROR, FATAL, etc.). As another example, the line items for at least certain categories of log events (e.g., Network events, Lifecycle events, etc.) may include additional information regarding the outcome of the log event (e.g., success or failure) and/or the duration of the log event, among other possible details that may be included in a line item for a specific log event. Further, as with the contextual attributes, the timeline view may also utilize different icons and/or different coloring to distinguish between the different details that may be presented for an event as well as to distinguish between the different values that may be presented for a given event-details attribute across different line items, which may enable a user to more quickly interpret the progression and relationship of events within the timeline view. For instance, the timeline view may utilize different icons and/or different coloring to represent the different values for the severity-level attribute (e.g., TRACE, DEBUG, INFO, WARN, ERROR, FATAL, etc.) and/or the different values for the event-outcome attribute (e.g., success vs. failure), among other possibilities, which may enable a user to more quickly distinguish between the different values of such event-detail attributes from one event to another while navigating through the timeline view.

Along with presenting the timeline view comprising the time-sorted listing of line items for log events (and perhaps other types of events) related to a runtime session, the disclosed session analysis tool may also include other features that may further enhance the useability of the timeline view. For example, the disclosed session analysis tool may provide a highlighting feature that enables a user to highlight or otherwise flag an event that is shown within the timeline view, which may allow that event to be located more quickly in the future by the user that highlighted the event and/or other users that are also tasked with reviewing and analyzing runtime sessions of the client application. Additionally, in some implementations, the highlighting feature could also provide a user with the ability to add a note to a highlighted event (e.g., by typing the note into a popup window) that can then be accessed later by the user that highlighted the event and/or other users that are also tasked with reviewing and analyzing runtime sessions of the client application.

As another example, the disclosed session analysis tool may provide a filtering feature that enables a user to narrow the universe of events that are displayed within the timeline view based on any of various factors, examples of which may include event category, event severity level, and/or one or more of the contextual attributes described above.

As yet another example, the disclosed session analysis tool may be capable of presenting a "mini-map" view that provides an at-a-glance visualization of the volume of certain categories of log events (or perhaps other types of events) that were recorded during the course of a runtime session of a client application. In accordance with the present disclosure, such a mini-map view may comprise a respective two-dimensional plot for each of one or more categories of log events, where a vertical dimension of each log event category's respective two-dimensional plot represents a volume of log events for that log event category and a horizontal dimension of the log event category's respective two-dimensional plot represents the time within the runtime session. In an implementation where the mini-map view includes respective two-dimensional plots for multiple log event categories, these two-dimensional plots may be "stacked" vertically on top of one another and aligned horizontally, such that they share a common time axis.

In at least some implementations, the mini-map view may also include visual indicators (e.g., colored icons) that identify certain events of interest, examples of which may include highlighted log events and/or other types of events detected by the client application during the runtime session (e.g., a trigger event that triggered a change in the logging behavior of the client application). These visual indicators may also be selectable to enable a user to easily navigate to a point within the timeline view that corresponds to the selected event. Additionally, the mini-map view may enable a user to view further information about an event of interest by hovering over the event's visual indicator.

In at least some implementations, the mini-map view may further present certain contextual information associated with the log events (and perhaps other types of events) that were recorded during the runtime session. For instance, the mini-map view may utilize different background shading and/or colorization within each log event category's respective two-dimensional plot in order to indicate different contextual values of a given contextual attribute, such as application state or network connection state. To illustrate with an example, the mini-map view may utilize a white background to indicate ranges of time during each log event category's respective two-dimensional plot when the client application was in a background state and utilize a shaded background to indicate ranges of time during each log event category's respective two-dimensional plot when the client application was in a foreground state. Many other examples are possible as well.

Further yet, in at least some implementations, the filtering feature described above may also function to narrow the universe of log events that are represented within the mini-map view.

The timeline and/or mini-map views that are provided by the disclosed session analysis tool may take various other forms as well.

Turning now to FIG. 1, one possible example of a user-interface view 100 that could be provided by the disclosed session analysis tool for a given runtime session of a given client application is illustrated. As shown in FIG. 1, the example user-interface view 100 may include a session details pane 102 and a timeline pane 104 that in this example includes both an example timeline view 106 and an example mini-map view 108. However, it should be understood that the example user-interface view 100 provided by the disclosed session analysis tool could take various other forms as well—including but not limited to the possibility that the timeline pane 104 may include either a timeline view or a mini-map view, but not both.

The session details pane 102 may present certain session-details information about the given runtime session of the given client application, which may take any of various forms. For example, as shown in FIG. 1, such session-details information may include (i) application information for the given client application, such as the name of the given client application and the version of the client application (e.g., iOS version 1.1), (ii) "Device" information for the end-user client device on which the given runtime session of the given client application occurred, such as the brand and/or model of end-user client device (e.g., iPhone 14.2) and/or the version of operating system software that was installed on the end-user client device at the time that the runtime session occurred (e.g., iOS 15.5), among other possible examples, (iii) "Duration" information for the given runtime session, such as the length of the session (e.g., 4 hr 0 min 0 sec) and/or the start and end times of the session (e.g., Jun. 29, 2022, 8:30:00 PDT-Jun. 29, 2022, 12:30:00 PDT), and (iv) a "Session ID" for the given runtime session (e.g., 1A2B3C4D5E). The session details pane 102 could include other session-details information about the given runtime session of the given client application as well.

Turning to the timeline pane 104, as shown, the example timeline view 106 presents log events that were recorded during the given runtime session in the form of a scrollable, time-sorted listing 110 of respective line items for the log events, where each log event's respective line item in the time-sorted listing 110 includes (i) timing information 112 for the log event (e.g., a date and time when the log event was recorded), (ii) a category icon 114 for the log event that indicates the log event's category, (iii) a textual descriptor 116 of the log event (which may take a different form depending on the log event's category), (iv) a set of contextual information 118 associated with the log event, which may comprise a set of icons that indicate values for contextual attributes such as the client device's network connection state, the client application's state, and/or the networking library being utilized by the client application, among other possibilities, and perhaps also (v) event details information 120 that comprises additional details regarding the log event. Along with this information, each of the line items in the scrollable, time-sorted listing 110 is also shown to include a selectable element (e.g., a checkbox) that enables a user to select a line item for purposes of highlighting and/or taking other actions with respect to the log event.

For example, in the time-sorted listing 110, a first line item 110A for a first log event is shown to include (i) timing information 112 for the first log event that takes the form of a capture date of "6/29" and a capture time of "8:30:00.018," (ii) a category icon 114 for the first log event that takes the form of an icon representing a Lifecycle event, (iii) a textual descriptor 116 of the first log event that comprises a "Lifecycle" text label indicating that this is a Lifecycle event along with the descriptive phrase "app launch (binary loading)," which previews the type of lifecycle event that occurred, (iv) a set of contextual information 118 associated with the first log event that takes the form of a set of three icons, with a first icon (from left to right) indicating that the end-user client device was connected to a cellular network when the first log event was recorded, a second icon indicating that the given client application was in the foreground when the first log event was recorded, and a third icon indicating that the given client application was using a custom networking library (e.g., the Envoy Mobile networking library) when the first log event was recorded, and (v) event details information 120 for the first log event that takes the form of an icon indicating that the first log event has a severity level of DEBUG and an additional textual descriptor comprising the phrase "Idle 30798841 ms," which indicates that the first log event had a duration of 30798841 ms (and that the given client application was idle during the course of that log event).

As another example, a second line item 110B for a second log event is shown to include (i) timing information 112 for the second log event that takes the form of a capture date of "6/29" and a capture time of "9:01:23.115," (ii) a category icon 114 for the second log event that takes the form of an icon representing a Client Action log event, (iii) a textual descriptor 116 of the second log event that comprises a "Client Action" text label indicating that this is a Client Action log event along with the descriptive phrase "User Location Push Update," which previews the type of client action event that occurred, (iv) a set of contextual information 118 associated with the second log event that takes the form of a set of three icons, with a first icon (from left to right) indicating that the end-user client device was connected to a cellular network when the second log event was recorded, a second icon indicating that the given client application was in the foreground when the second log event was recorded, and a third icon indicating that the given client application was using a custom networking library (e.g., the Envoy Mobile networking library) when the second log event was recorded, and (v) event details information 120 for the second log event that takes the form of an icon indicating that the second log event has a severity level of DEBUG and an additional textual descriptor comprising the phrase "Success (0ms)," which indicates that the second log event (i.e., the user location push update) had a duration of 0 ms and was successful.

As yet another example, a third line item 110C for a third log event is shown to include (i) timing information 112 for the third log event that takes the form of a capture date of "6/29" and a capture time of "9:02:26.213," (ii) a category icon 114 for the third log event that takes the form of an icon representing a UX log event, (iii) a textual descriptor 116 of the third log event that comprises a "UX" text label indicating that this is a UX log event along with the descriptive phrase "Avatar Display displayed," which previews the type of UX event that occurred, (iv) a set of contextual information 118 associated with the third log event that takes the form of a set of three icons, with a first icon (from left to right) indicating that the end-user client device was connected to a cellular network when the third log event was recorded, a second icon indicating that the given client application was in the foreground when the third log event was recorded, and a third icon indicating that the client application was using a custom networking library (e.g., the Envoy Mobile networking library) when the third log event was recorded, and (v) event details information 120 for the third log event that takes the form of an icon indicating that the third log event has a severity level of DEBUG.

As still another example, a fourth line item 110D for a fourth log event is shown to include (i) timing information 112 for the fourth log event that takes the form of a capture date of "6/29" and a capture time of "9:26:50.797," (ii) a category icon 114 for the fourth log event that takes the form of an icon representing a Network request log event (note also that fourth line item 110D includes a second such icon in front of the textual descriptor 116 that takes the form of an arrow pointing right to reflect it is a request as opposed to a response), (iii) a textual descriptor 116 of the fourth log event that comprises a "GET" text label indicating that this is a Network log event for a GET response along with the descriptive phrase "/api/user-details," which previews the path of the GET response, (iv) a set of contextual information 118 associated with the fourth log event that takes the form of a set of three icons, with a first icon (from left to right) indicating that the end-user client device was connected to a Wi-Fi network when the fourth log event was recorded, a second icon indicating that the given client application was in the background when the fourth log event was recorded, and a third icon indicating that the client application was using a native networking library (specifically, an Apple iOS networking library as denoted by the "I" icon) when the fourth log event was recorded, and (v) event details information 120 for the fourth log event that takes the form of an icon indicating that the fourth log event has a severity level of DEBUG along with an additional textual descriptor comprising the phrase "Success (170 ms)," which indicates that the fourth log event (i.e., the GET request) had a duration of 170 ms and was successful.

The information that is shown within the line items for the log events may take any of various other forms as well.

Further, while the scrollable time-sorted listing 110 of FIG. 1 shows line items for 6 log events within the example user interface 100, it should be understood that the time-sorted listing 110 could be designed to show various different numbers of log events within the user interface, and that the number of log events shown within the user interface may also vary depending on the size of the client device's display screen, among other factors.

Although not shown in FIG. 1, the category indicator 114 and/or textual descriptor 116 of each log event's line item in the time-sorted listing 110 may also be color-coded in a manner that reflects the category of the log event. For example, the category indicator 114 and/or textual descriptor 116 for the first line item 110A may be displayed in a first color that represents Lifecycle log events, the category indicator 114 and/or textual descriptor 116 for the second line item 110B may be displayed in a second color that represents Client Action log events, the category indicator 114 and/or textual descriptor 116 for the third line item 110C may be displayed in a third color that represents UX log events, and the category indicator 114 and/or textual descriptor 116 for the fourth line item 110D may be displayed in a fourth color that represents Network log events, among other possibilities. In this way, the color-coding of the category indicator 114 and/or textual descriptor 116 of each log event's line item may enable a user to more quickly interpret the progression and relationship of the log events within the timeline view 106.

Similarly, although not shown in FIG. 1, the icons that indicate the values for at least some of the contextual attributes may also be color-coded in a manner that reflects the different values of the contextual attributes. For instance, with respect to the icon that indicates the network connection state associated with a log event, in addition to taking a different visual form depending on which network connection state is being indicated (e.g., a cellular icon vs. a Wi-Fi icon), the icon may have a different color depending on which log level is being indicated (e.g., a first color for cellular, a second color for Wi-Fi, etc.). Further yet, with respect to the icon that indicates the application state associated with a log event, in addition to taking a different visual form depending on which application state is being indicated (e.g., a foreground icon vs. a background icon), the icon may have a different color depending on which application state is being indicated (e.g., a first color for foreground, a second color for background, etc.). Still further, with respect to the icon that indicates the networking library associated with a log event, in addition to taking a different visual form depending on which networking library is being indicated (e.g., an Apple iOS icon vs. an Envoy Mobile icon), the icon may have a different color depending on which networking library is being indicated (e.g., a first color for Apple iOS, a second color for Envoy Mobile, etc.).

In this way, the color-coding of the icons for the contextual attributes may enable a user to more quickly interpret the progression and relationship of log events within the timeline view. For example, as a user is navigating through the time-sorted listing 110 of line items, the color-coding may enable the user to more quickly identify a change in the value of a contextual attribute during the given runtime session, such as the change in network connection state from cellular to Wi-Fi between line items 110C and 110D, the change in application state from foreground to background between line items 110C and 110D, and/or the change in networking library from a custom networking library (e.g., Envoy Mobile) to a native networking library (e.g., Apple iOS) between line items 110C and 110D, among other possibilities, which may then allow the user to more efficiently review the log information for the given runtime session of the given client application.

Similarly yet, although not shown in FIG. 1, the icons that indicate the values for at least some of the event-details attributes may also be color-coded in a manner that reflects the different values of the event-detail attributes, which enable a user to more quickly distinguish between the different values of such event-details attributes from one log event to another while navigating through the timeline view. For instance, with respect to the icon that indicates a severity level of a log event, in addition to taking a different visual form depending on which severity level is being indicated (e.g., a "D" icon for DEBUG, a "W" icon for WARN, an "E" icon for ERROR, etc.), the icon may have a different color depending on which severity level is being indicated (e.g., a first color for DEBUG, a second color for WARN, a third color for ERROR, etc.). Further, with respect to the textual descriptor that indicates the outcome of a log event, in addition to having a textual phrase depending on the outcome being indicated (e.g., "success" vs. "failure"), the textual descriptor may have a different color depending on the outcome being indicated (e.g., a first color for success, a second color for failure, etc.).

As shown in FIG. 1, the timeline pane 104 may also include the example mini-map view 108, which provides an at-a-glance visualization of the volume of certain categories of log events that were recorded over the course of the given runtime session of the given client application. In particular, the example mini-map view 108 is shown to include (i) a first two-dimensional plot 108A showing the volume of Lifecycle log events that were recorded over the course of the given runtime session of the given client application, (ii) a second two-dimensional plot 108B showing the volume of Network log events that were recorded over the course of the given runtime session of the given client application, and (iii) a third two-dimensional plot 108C showing the volume of UX log events that were recorded over the course of the given runtime session of the given client application, where a vertical dimension of each of the two-dimensional plots 108A-C represents a volume of log events for the associated log event category and a horizontal dimension of each of the two-dimensional plots 108A-C represents the time within the runtime session. Further, these three two-dimensional plots 108A-C are shown to be "stacked" vertically on top of one another and aligned horizontally such that they share a common time axis, which is shown on the top of the example mini-map view 108. In the example of FIG. 1, the time axis is showing a time range spanning from 8:30 PDT to 12:30 PDT, but it should be understood that a user may zoom in or out and/or may navigate to any of various time ranges within the given runtime session.

Within each of the two-dimensional plots 108A-C, the volume of the log events within a given category is then represented using vertical bars that are shown for different time segments within the given runtime session, where the height of the respective vertical bar for each time segment provides an indication of the volume of log events within the given category that were recorded during the given runtime session. In this respect, a vertical bar for a time segment that has a greater height indicates that a larger volume of log events within the given category were recorded during the time segment, whereas a vertical bar for a time segment that has a lesser height indicates that a smaller volume of log events within the given category were recorded during the time segment. For instance, in each of the two-dimensional plots 108A-C, the example mini-map view 108 shows respective vertical bars for various different time segments spanning from 8:30 PDT of the given runtime session to 12:30 PDT of the given runtime session, where these vertical bars vary in height from time segment to time segment to indicate how the volume of recorded log events within the respective category varied across those time segments.

To illustrate with reference to the two-dimensional plot 108A for the Lifecycle log events, the vertical bar at the 8:30 PDT marker has a greater height that is indicative of a larger volume of Lifecycle log events being recorded during that time segment, while the vertical bar at the 9:30 PDT marker has a lesser height that is indicative of a smaller volume of Lifecycle log events being recorded during that time segment. Further, the two-dimensional plot 108A for the Lifecycle log events does not have any vertical bars for certain time segments within the time range of 8:30 PDT to 12:30 PDT, which indicates that no meaningful volume of Lifecycle log events were recorded during those time segments. The two-dimensional plots 108B-C for the Network and UX log events have a similar form.

Further, the example mini-map view 108 may also include visual indicators that identify certain events of interest. For example, as shown in FIG. 1, the example mini-map view 108 may utilize one type of visual indicator, shown in FIG. 1 as a white diamond, to identify log events flagged by log events that have been highlighted by a user, and may utilize another type of visual indicator, shown in FIG. 1 as a black diamond, to identify trigger events that were detected by the given client application. In line with the discussion above, these visual indicators may be selectable by a user to enable the user to easily navigate to a point within the example timeline view 106 that corresponds to the selected event of interest, and a user may also be provided with the ability to view further information about an event of interest by hovering over the event's visual indicator.

Further yet, the example mini-map view 108 may utilize different background shading and/or colorization within each of the two-dimensional plots 108A-C in order to indicate different contextual values for a given contextual attribute, such as application state or network connection state. For example, as shown in FIG. 1, the example mini-map view 108 utilizes a white background for each of the two-dimensional plots 108A-C to indicate ranges of time during which the given client application was in a background state, and utilizes a shaded background for each of the two-dimensional plots 108A-C to indicate ranges of time during which the given client application was in a foreground state. Many other examples are possible as well.

In line with the discussion above, the timeline pane 104 may include other features as well, which will be described in further detailed below.

While the disclosed technology is described above in the context of presenting log information and/or other related information for runtime sessions of client applications running on end-user client devices, the disclosed technology could also be utilized in a similar manner to present log information and/or other related information for runtime sessions of client applications running on software-provider client devices (e.g., during development, testing, etc. of a client application) and/or runtime sessions of a server application running on a back-end platform (e.g., a microservice), among other possible other types of software applications for which the disclosed technology can be utilized to present log information and/or other related information.

The functionality and advantages of the disclosed session analysis tool will now be described in further detail with reference to FIGS. 2-8.

Figure 2:
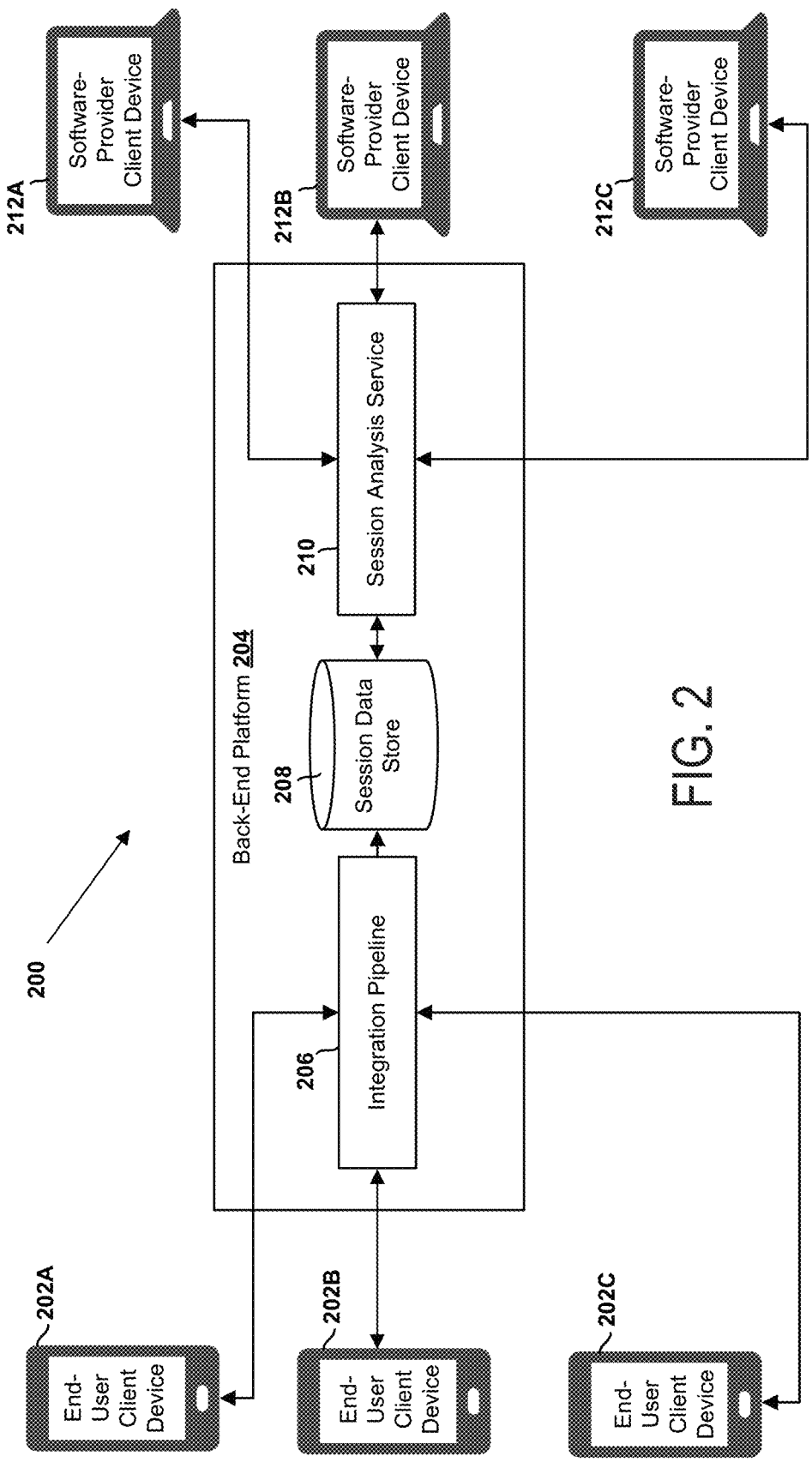
FIG. 2 is an illustration of an example network environment in which the disclosed technology may be implemented.

To begin, FIG. 2 is an illustration of an example network environment 200 in which the disclosed technology may be implemented for a given client application that has been released by a given software provider. As shown in FIG. 2, the example network environment 200 may include a plurality of end-user devices 202 that are installed with the given client application, of which end-user client devices 202A, 202B, and 202C are shown as representative examples, a back-end platform 204 of the given software provider, and a plurality of software-provider client devices 212, of which software-provider client devices 212A, 212B, and 212C are shown as representative examples. Further, while the disclosed technology is at times described below with reference to the end-user client device 202A and the software-provider client device 212A, it should be understood that the discussion may be applicable to any of the end-user client devices 202A-C and any of the software-provider client devices 212A-C shown in FIG. 2.

In line with the discussion above, the given client application that is installed on each of the end-user client devices 202A-C can take any of various forms, including but not limited to any of the different forms of client applications described above (e.g., a mobile application, desktop application, web application, or the like). Further, in line with the discussion above, it is possible that issues may arise during runtime sessions of the given client application that may be of interest to the given software provider, such as issues that may hinder or otherwise negatively affect the performance of the given client application. In order to provide increased visibility into these issues, the given client application installed on the end-user client devices 202A-C may be programmed by the given software provider to include functionality for collecting and reporting certain information about runtime sessions of the client application, such as (i) a set of session-details information for a runtime session of the given client application (e.g., a Session ID, application information for the given client application, device information for the end-user client device on which the runtime session of the given client application occurred, and/or duration information for the runtime session), (ii) a set of log information for the runtime session of the given client application, which as noted above may comprise a time sequence of log entries for log events corresponding to a given log level setting (e.g., a log level setting of TRACE or DEBUG), (iii) a set of contextual information associated with the given set of log information for the runtime session of the given client application, which as noted above may comprise a respective time sequence of contextual values for each of various contextual attributes (e.g., application state, network connection state, networking library, etc.), and perhaps also (iv) a set of analytics events information for the runtime session of the given client application. As such, during each runtime session of the given client application, the end-user client device 202 that is running the given client application may carry out this functionality for collecting log information about the runtime session and then reporting such information to the back-end platform 204 of the given software provider.

In general, each of the end-user client devices 202A-C may take the form of any client device that is capable of running the given client application. In this respect, each of the end-user client devices 202A-C includes hardware components such as one or more processors, data storage, one or more communication interfaces, and user-interface components (or interfaces for connecting thereto), among other possible hardware components. The end-user client devices 202A-C also include software components such as operating system software and the given client application, among various other possible software components. As representative examples, each of the end-user client devices 202A-C could be any of a smartphone, a tablet, a laptop, or a desktop computer, among other possibilities, and it should be understood that different end-user client devices 202A-C could take different forms (e.g., different types and/or models of client devices).

Further, as shown in FIG. 2, each of the end-user client devices 202A-C may be configured to communicate with the back-end platform 204 of the given software provider over a respective communication path. Each of these respective communication paths may generally comprise one or more data networks and/or data links, which may take any of various forms. For instance, each respective communication path between an end-user client device 202 and the back-end platform 204 may include any one or more of Personal Area Networks (PANs), Local Area Networks (LANs), Wide Area Networks (WANs) such as the Internet or cellular networks, cloud networks, and/or point-to-point data links, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

As further shown in FIG. 2, the back-end platform 204 of the given software provider may comprise an integration pipeline 206, a session data store 208, and a session analysis service 210, among other possibilities. Each of these functional components of the back-end platform 204 may be configured to perform certain back-end functionality in accordance with the present disclosure.

For instance, the integration pipeline 206 of the back-end platform 204 may be configured to (i) receive information for runtime sessions of the given client application that was collected and reported by the end-user client devices 202A-C, (ii) prepare such information for storage in the session data store 208 to be used by the session analysis service 210, wherein such preparation may involve performing certain pre-processing operations on the log information and/or the associated contextual information (e.g., validation, cleansing, deduplicati on, filtering, aggregation, summarization, enrichment, restructuring, reformatting, translation, mapping, etc.), and then (iii) write the received information for the runtime sessions of the given client application to the session data store 208, which may then be accessible by the session analysis service 210 as well as other functional subsystems of the back-end platform 204.

Further, in general, the session analysis service 210 of the back-end platform 204 may be configured to perform the back-end functionality for the disclosed session analysis tool, which may involve (i) receiving a request from a given software-provider client device 212 to access information for a given runtime session of the given client application, (ii) retrieving certain information for the given runtime session of the given client application from the session data store 208, and (iii) transmitting a response to the given software-provider client device 212 that comprises instructions and data for presenting at least a portion of the retrieved information for the given runtime session of the given client application in the form of a timeline view and/or a mini-map view, among other possible back-end functions that may be performed by the session analysis service 210.

In practice, the back-end platform 204 of the given software provider may comprise some set of physical computing resources (e.g., processors, data storage, etc.) utilized to implement the foregoing functional subsystems. This set of physical computing resources may take any of various forms. As one possibility, the back-end platform 204 may comprise cloud computing resources supplied by a third-party provider of "on demand" cloud computing resources, such as Amazon Web Services (AWS), Amazon Lambda, Google Cloud Platform (GCP), Microsoft Azure, or the like. As another possibility, the back-end platform 204 may comprise "on-premises" computing resources of the given software provider (e.g., servers owned by the given software provider). As yet another possibility, the back-end platform 204 may comprise a combination of cloud computing resources and on-premises computing resources. Other implementations of the back-end platform 204 are possible as well.

Further, in practice, the functional subsystems of the example back-end platform 204 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Turning lastly to the software-provider client devices 212A-C, each of the software-provider client devices 212A-C may generally take the form of any client device that is capable of accessing and running the disclosed session analysis tool. In this respect, each of the software-provider client devices 212A-C includes hardware components such as one or more processors, data storage, one or more communication interfaces, and user-interface components (or interfaces for connecting thereto), among other possible hardware components, as well as software components such as operating system software and software for accessing and running the disclosed session analysis tool (e.g., a mobile application, desktop application, or web browser), among various other possible software components. As representative examples, each of the software-provider client devices 212A-C could be any of a smartphone, a tablet, a laptop, or a desktop computer, among other possibilities, and it should be understood that different software-provider client devices 212A-C could take different forms (e.g., different types and/or models of client devices).

Further, each of the software-provider client devices 212A-C may be configured to communicate with the back-end platform 204 of the given software provider over a respective communication path that may take a similar form to the respective communication paths between the end-user client devices 202A-C may and the back-end platform 204.

Figure 3:
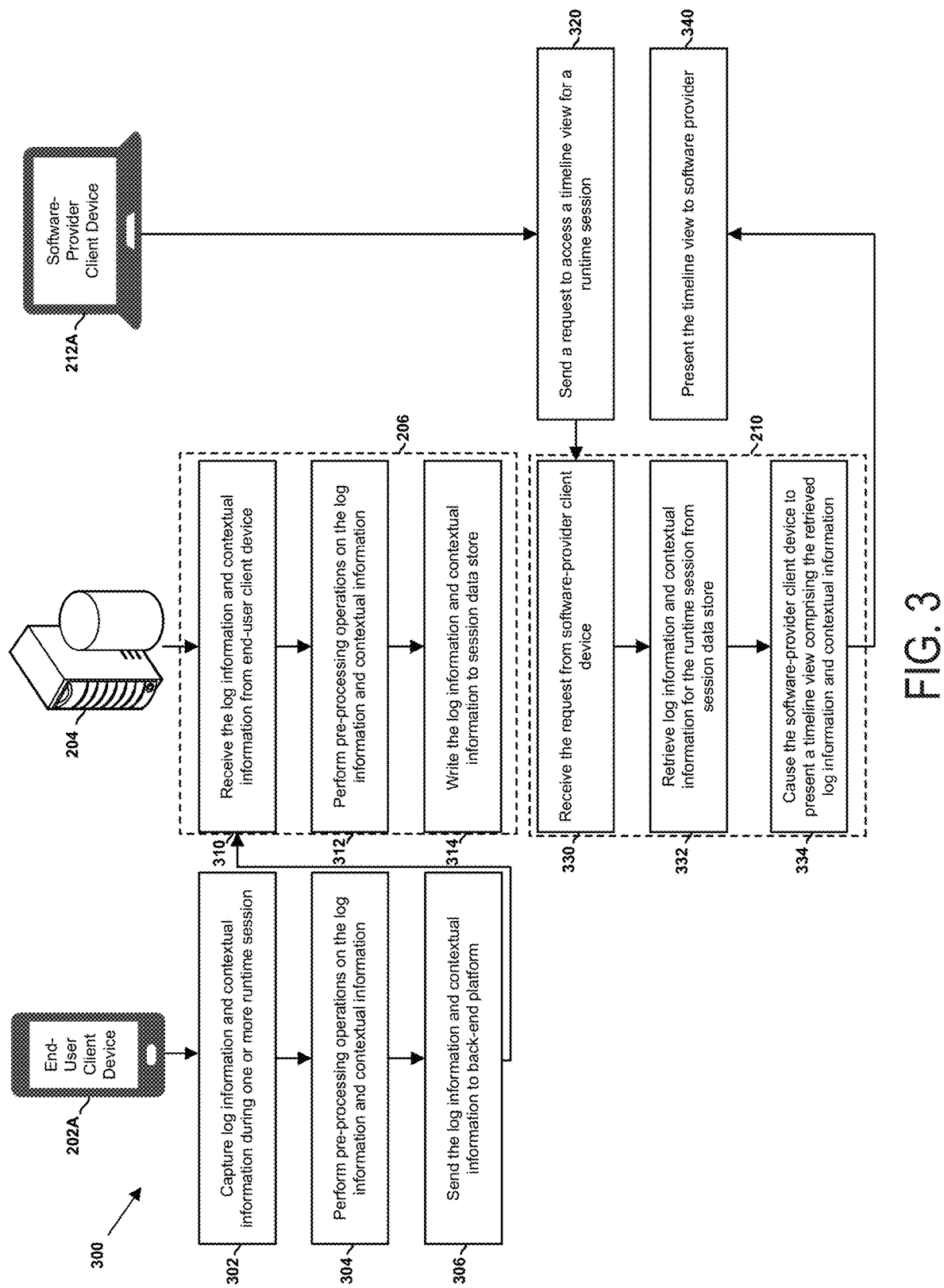
FIG. 3 is a flow diagram that illustrates one example of operations of an example process that may be carried out in accordance with the disclosed technology.

Turning now to FIG. 3, a flow diagram 300 is provided that shows some example operations of an example process that may be carried out in accordance with the present disclosure. For purposes of illustration only, the operations are described as being carried out by the example end-user client device 202A, the example back-end platform 204, and the example software-provider client device 212A within the example network environment of FIG. 2. It should be understood, however, that this functionality may be carried out by any of various other devices in any of various other network environments as well.

As shown in FIG. 3, the process may begin at block 302 with the end-user client device 202A collecting certain information for one or more runtime sessions of the given client application, which may include session-details information, log information along with associated contextual information, and perhaps also analytics-events information, among other possibilities. This function may take any of various forms.

To begin, as described above, the log information that is collected by the end-user client device 202A during a given runtime session of the given client application may comprise a time sequence of log entries for log events corresponding to a given log level setting, such as a TRACE or DEBUG log level setting. Such a log level setting generally specifies the least severe level of log events for which log entries are to be generated by the end-user client device 202 while running the given client application, and the end-user client device 202A may function to generate log entries for any log events having a severity level that is at the specified level or is more severe than the specified level (e.g., under a DEBUG log level setting, the end-user client device 202A is configured to generate log entries for DEBUG level, INFO level, WARN level, ERROR level, and FATAL level log events). These log events that are recorded by the end-user client device 202A during a given runtime session of the given client application in the form of log entries may fall into any of various different categories.

For instance, one possible category of log events that may be recorded by the end-user client device 202A during a given runtime session of the given client application may comprise "Lifecycle" log events that are related to lifecycle actions performed for the given client application, examples of which may include (i) launching the given client application, (ii) placing the given client application in the background of the end-user client device 202A, (iii) placing the given client application in the foreground of the end-user client device 202A, and/or (iv) terminating the given client application, among other possibilities.

Another possible category of log events that may be recorded by the end-user client device 202A during a given runtime session of the given client application may comprise "Client Action" log events that may be related to internal actions taken by the given client application, examples of which may include (i) coordinating communications between the given client application and the back-end platform 204, such as via pushers, (ii) accessing and updating persistent storage of the given client application, and/or (iii) maintaining temporary storage of the given client application, such as generating, updating, or clearing temporary caches, among other possibilities.

Yet another possible category of log events that may be recorded by the end-user client device 202A during a given runtime session of the given client application may comprise "Network" log events that involve the transmission of network requests by the given client application (e.g., to the back-end platform 204) or the receipt of network responses by the given client application (e.g., from the back-end platform 204). As examples, these network requests and responses may comprise network messages that are sent using HTTP methods (e.g., GET, POST, UPDATE, DELETE, etc.) and/or network messages that take some other form (e.g., an ntp_synchronization network call), other among other possibilities.

Still another possible category of log events that may be recorded by the end-user client device 202A during a given runtime session of the given client application may comprise "UX" log events, examples of which may include (i) user input events, which could take various forms (e.g., button presses, typing, various touch gestures such as holding, sliding, etc., among others), and (ii) visual updates to the displayed user interface of the given client application, which could take various forms (e.g., a change in the user-interface elements displayed by the given client application), among other possible UX events.

The end-user client device 202A may be configured to record other categories of log events during a runtime session of the given client application as well, including but not limited to categories that are specifically tailored to the given client application.

Further, each log event that is recorded by the end-user client device 202A during a given runtime session of the given client application may be memorialized in the form of a log entry comprising a certain set of log information for the log event, where this set of log information may take any of various forms. For instance, a log entry for a given log event may include timing information for the given log event (e.g., a date and/or time when the log event was recorded), an identification of the given log event (e.g., a name or alphanumeric code), category and/or type information for the given log event, a textual description of the log event, a severity level of the given log event, and/or an identification of the particular portion of the given client application that was impacted by the given log event (e.g., the particular module or code within the given client application that is impacted), among other possibilities. Additionally, depending on the type and/or category of the given log event, the log entry for the given log event may include other details about the given log event as well, examples of which may include a duration of the given log event (e.g., how long a given event took from start to finish) and/or an outcome of the log event (e.g., success or failure), among other possibilities.

Turning next to the contextual information that is collected by the end-user client device 202A during a given runtime session of the given client application, as described above, such contextual information may comprise a respective time sequence of contextual values for each of various contextual attributes that may provide context for the log events that are recorded by the end-user client device 202A, such as attributes related to the state and/or operation of the client application, attributes related to the state and/or operation of the end-user client device running the client application, and/or attributes related to the user's interaction with the end-user client device running the client application, among other possibilities. These contextual attributes may take any of various forms.

For instance, one possible type of contextual attribute for which contextual values may be captured by the end-user client device 202A during a given runtime session of the given client application may comprise a contextual attribute that indicates a current application state of the given client application, such as whether the given client application is in the background or foreground of the end-user client device 202A.

Another possible type of contextual attribute for which contextual values may be captured by the end-user device 202A during a given runtime session of the given client application may comprise a contextual attribute that indicates a current network connection state of the end-user device 202A, such as whether the end-user client device 202A has a cellular connection to the internet (e.g., a 5G connection), a Wi-Fi connection to the internet, or no connection, among other possibilities.

Yet another possible type of contextual attribute for which contextual values may be captured by the end-user device 202A during a given runtime session of the given client application may comprise a contextual attribute that indicates a current networking library being utilized by the given client application, which may have any of various values depending on the given client application, examples of which may include a given type of custom networking library (e.g., an Envoy Mobile networking library) or a given type of native networking library (e.g., an Apple iOS networking library or an Android networking library), among others.

The end-user device 202A could be configured to capture contextual values for various other contextual attributes during a given runtime session of the given client application as well, examples of which may include a contextual attribute that indicates a location of the end-user client device 202A (e.g., city/state, zip code, etc.), a contextual attribute that indicates a permissions level of the user of the given client application, and/or a contextual attribute that indicates weather conditions associated with the location of the end-user client device 202A, among various others.

Further, in practice, the end-user client device 202A's functionality of collecting the log information and associated contextual information during a runtime session of the given client application may take various forms. For instance, as one possible implementation, the end-user client device installed with the given client application may be configured to run a common process for collecting both the log information and the contextual information during a runtime session of the given client application. For example, the end-user client device 202A installed with the given client application may be configured such that each time it detects a new log event during a runtime session of the given client application that is to be memorialized by a new log entry, the end-user client device 202A may responsively capture a snapshot of contextual values for the contextual attributes of interest and then either include that snapshot of contextual values within the new log entry for the newly-detected log event or memorialize that snapshot of contextual values in a separate data record that is associated with the new log entry in some way (e.g., via a record identifier that is included within the new log entry).

As another possible implementation, the end-user client device 202A installed with the given client application may be configured to run separate processes for collecting the log information and the associated contextual information during a runtime session of the given client application. For example, the end-user client device 202A may be configured to run one process that monitors for log events and generates log entries for detected log events, and then a separate process (or perhaps multiple processes) for capturing a respective time sequence of contextual values for each of the contextual attributes of interest during the runtime session of the given client application. In such an implementation, the log entries may then later be associated with the recorded contextual values (either by the end-user client device 202A or the back-end platform 204) using timing information for the collected log information and the collected contextual information, among other possibilities.

The end-user client device's functionality of collecting the log information and associated contextual information during a runtime session of the given client application may take other forms as well.

Further yet, in practice, the end-user client device 202A installed with the given client application may be capable of changing the log information and/or contextual information that it is configured to collect depending on the circumstances under which the given client application is being run. For example, when the given client application is first launched, the given client application may cause the end-user client device 202A to collect a default set of log information and a default set of associated contextual information during runtime sessions of the given client application. However, in at least some implementations, the end-user client device 202A installed with the given client application could also be capable of thereafter monitoring for the occurrence of certain trigger events that, if detected, cause the end-user client device 202A to begin collecting an altered set of log information and/or an altered set of associated contextual information during runtime sessions of the given client application.

After collecting the log information and associated contextual information for a runtime session of the given client application, the end-user client device 202A can also store the collected log information and associated contextual information (at least temporarily) by writing it to the local storage of the end-user client device 202A. In practice, log information and associated contextual information may be written to the end-user client device's local data storage utilizing any of various storage architectures, examples of which may include one or more volatile storage structures that are allocated within the random access memory (RAM) of the end-user client device 202A (e.g., one or more RAM-based buffers and/or RAM-based linked lists), one or more non-volatile storage structures that are allocated within the disk storage of the end-user client device 202A (e.g., disk-based buffers, disk-based databases, disk-based file stores, and/or disk-based object stores), or some combination thereof. Further, in practice, the collected log information and associated contextual information could either be stored together in a common storage structure or be stored in separate storage structures. Other implementations are possible as well.

Turning to block 304 of FIG. 3, the end-user client device 202A may optionally perform pre-processing operations on the log information and/or associated contextual information for the one or more runtime sessions of the given client application that is collected by the end-user client device 202A. These pre-processing operations may take any of various forms.

As one possibility, the end-user client device's pre-processing operations may involve any of various operations for preparing the log information and/or associated contextual information for further processing by the back-end platform 204, including but not limited to operations such as validation, cleansing, deduplication, filtering, aggregation, summarization, enrichment, restructuring, reformatting, translation, and/or mapping, among others.

As another possibility, if the end-user client device 202A installed with the given client application is configured to run separate processes for collecting the log information and the associated contextual information during a runtime session of the given client application, the end-user client device's pre-processing operations may involve functionality for (i) identifying associations between log entries and contextual values, and (ii) memorializing the identified associations between the log entries and the contextual values for later use.

The end-user client device 202A may identify associations between log entries and contextual values in any of various ways. For instance, in one implementation, the end-user client device 202A may identify associations between log entries and contextual values on a log-entry-by-log-entry basis, where the functionality for identifying each respective log entry's associated contextual values involves identifying for each contextual attribute of interest, the contextual value of the contextual attribute that was captured closest in time to the respective log entry by comparing the capture times of the contextual values of the contextual attribute to the capture time of the respective log entry. However, while carrying out such functionality, it is possible that the end-user client device 202A may identify two contextual values for a given contextual attribute that are equally close in time to a respective log entry, such as one contextual value for the given contextual attribute that was captured a given amount of time prior to the respective log entry and another contextual value for the given contextual attribute that was captured that same given amount of time after the respective log entry. In such instances, the functionality for identifying each respective log entry's associated contextual values may additionally involve a determination of which of two identified contextual values of a given contextual attribute to associate with the respective log entry.

For instance, if the end-user client device 202A identifies two contextual values of a given contextual attribute that are candidates for association with a respective log entry, the end-user client device 202A may first determine whether the two identified contextual values for the given contextual attribute are the same (e.g., the two identified contextual values for an application-state contextual attribute are both background) or are different (one identified contextual value for an application-state contextual attribute is background while the other identified contextual value for the application-state contextual attribute is foreground). If the two identified contextual values for the given contextual attribute are the same, the end-user client device 202A may then simply identify that same contextual value as the one to associate with the respective log entry. On the other hand, if the two identified contextual values for the given contextual attribute are different, the end-user client device 202A may determine which one of the two identified contextual values for the given contextual attribute to associate with the respective log entry according to any of various strategies.

As one possible strategy, the end-user client device 202A may identify an association between the respective log entry and whichever one of the two identified contextual values for the given contextual attribute was captured prior to the respective log entry. As another possible strategy, the end-user client device 202A may identify an association between the respective log entry and whichever one of the two identified contextual values for the given contextual attribute was captured subsequent to the respective log entry. As yet another possible strategy, the end-user client device 202A may identify an association between the respective log entry and one of the two identified contextual values based on an analysis of nearby log entries and their associated contextual values for the same given contextual attribute, wherein the end-user device 202A may prioritize one of the two identified contextual values over the other if that one contextual value is not already reflected by the contextual values associated with nearby log entries. The end-user client device 202A may identify associations between log entries and contextual values in various other ways as well.

After identifying the associations between log entries and contextual values, the end-user client device 202A may be configured to memorialize the identified associations between the log entries and contextual values for later use. This may be performed in a variety of ways.

In one implementation, the end-user client device 202A may memorialize the identified associations between the log entries and the contextual values by updating each log entry to include the associated contextual values for the log entry. In another implementation, the end-user client device 202A may memorialize the identified associations between the log entries and the contextual values by updating each log entry to add in an identifier of a separate data record that contains the log entry's associated contextual values. The identified associations between the log entries and the contextual values may be memorialized in other manners as well.

The end-user client device 202A could be configured to perform other types of pre-processing operations on the log information and/or associated contextual information for the one or more runtime sessions of the given client application.

Turning next to block 306, the end-user client device 202A may function to report the collected log information and associated contextual information for the one or more runtime sessions of the given client application to the back-end platform 204. This function may take various forms, and in at least some implementations, may involve (i) retrieving the collected log information and associated contextual information for the given runtime session that is to be reported to the back-end platform 204 from the local data storage of the end-user client device 202A, (ii) preparing the log information and contextual information for transmission to the back-end platform 204 (e.g., by packaging it up into a format that is readable by the back-end platform 204) and then (ii) transmitting the log information and contextual information over the respective communication path between the end-user client device 202A and the back-end platform 204, which as noted above may include one or more data networks and/or data links.

In practice, the end-user client device 202A may report the log information and associated contextual information to the back-end platform 204 for the one or more runtime sessions of the given client application at any of various times. In one implementation, the end-user client device 202A may be configured to report the log information and associated contextual information for each respective runtime session of the given client application to the back-end platform 204 at the time that the respective runtime session of the given client application concludes (e.g., the end-user client device 202A may be configured to report a runtime session's log information and associated context information in response to determining that the runtime session has been terminated). In another implementation, the end-user client device 202A may be configured such that, if the given runtime session concludes at a time when the end-user client device 202A is only connected to a cellular network and not a Wi-Fi network, the given client application may wait to report the log information and associated contextual information for the given runtime session of the given client application to the back-end platform 204 until the end-user client device 202A re-connects to a Wi-Fi network in order to avoid utilizing cellular data to transmit the log information and associated contextual information—which could result in the end-user client device 202A sending log information and associated contextual information for multiple runtime sessions that have taken place since the end-user client device's last connection to a Wi-Fi network. The end-user client device 202A may report the log information and associated contextual information to the back-end platform 204 at other times as well.

Further, while the end-user client device 202A may be configured to report both the log information and associated contextual information to the back-end platform 204, it should be understood that in some implementations, the log information and associated contextual information could be collected and maintained by the end-user client device 202A as separate datasets, as previously discussed. In such implementations, the end-user client device 202A could be configured to report the log information and the contextual information to the back-end platform 204 either during a single communication session with the back-end platform 204 or over the course of multiple separate communication sessions with the back-end platform 204 (e.g., one session for the log information and one for the contextual information) that could take place at the same time or different times, among other possibilities as to the particular manner in which the log information and the contextual information could be reported from the end-user client device 202A to the back-end platform 204.

Further yet, along with reporting the log information and associated contextual information for a runtime session of the given client application, the end-user client device 202A may also report other information for the runtime session of the given client application, such as session-details information (e.g., a Session ID, application information for the given client application, device information for the end-user client device on which the runtime session of the given client application occurred, duration information for the runtime session, etc.) and/or analytics-events information, among other possibilities.

As shown at block 310, the integration pipeline 206 may then receive the information for the one or more runtime sessions of the given client application that was collected and reported by the end-user client device 202A, which may include log information and associated contextual information, session-details information, and perhaps also analytics-events information.

In turn, at block 312, the integration pipeline 206 may perform certain pre-processing operations on the received information for the one or more runtime sessions of the given client application. These pre-processing operations may take any of various forms.

As one possibility, the integration pipeline's pre-processing operations may involve any of various operations for preparing the received information for further use by the back-end platform 204, including but not limited to operations such as validation, cleansing, deduplication, filtering, aggregation, summarization, enrichment, restructuring, reformatting, translation, and/or mapping, among others.

As another possibility, if the log information and associated contextual information are received as separate datasets that do not indicate the associations between the log entries and the contextual values, the integration pipeline's pre-processing operations may involve functionality for (i) identifying associations between log entries and contextual values, and (ii) memorializing the identified associations between the log entries and the contextual values for later use. In this respect, the integration pipeline's functionality for performing these operations may take various forms, including but not limited to any of the forms described above with reference to the end-user client device 202A.

At block 314, the integration pipeline 206 may then write the received information for each runtime session of the given client application to the session data store 208, so that such information is available for future retrieval and use by the session analysis service 210. As noted, this information for each runtime session of the given client application may include log information and associated contextual information, session-details information, and perhaps also analytics-events information for the runtime session.

Turning next to block 320 of FIG. 3, while running client-side software for the disclosed session analysis tool (e.g., a mobile application, desktop application, web application, etc.), a given software-provider client device 212 such as the software-provider client device 212A may transmit a request to the session analysis service 210 for a timeline view and/or mini-map view of a given runtime session of the given client application (e.g., a runtime session of the given client application that was captured by the end-user client device 202A). In practice, this request may take the form of one or more request messages (e.g., one or more HTTP messages) that are sent over the respective communication path between the software-provider client device 212A and the back-end platform 204, and in at least some implementations, the one or more request messages may be sent via an Application Programming Interface (API). However, the software-provider client device's request may take other forms as well.

The software-provider client device 212A may be prompted to send such a request in any of various ways. As one illustrative example, an individual tasked with reviewing runtime sessions of the given client application on behalf of the given software provider (e.g., a developer, engineer, analyst, etc.) may decide that he or she wishes to review and analyze the log information for the given runtime session of the given client application (e.g., after learning that an issue of interest occurred during the given runtime session), and may then utilize the software-provider client device 212A to launch the client-side software for the disclosed session analysis tool, input information that identifies the given runtime session of the given client application for which to access the timeline view and/or mini-map view, and then provide a user input (e.g., selecting an "OK" button) that triggers the software-provider client device 212A to send the request for the timeline view and/or mini-map view of the given runtime session of the given client application. However, the software-provider client device 212A may be prompted to send such a request in other ways as well.

Further, the request for the timeline view and/or mini-map view that is sent from the software-provider client device 212A to the back-end platform 204 may take various forms, and in at least some implementations, may include identifying information for the given runtime session of the given client application session (e.g., an application ID, a session ID, etc.) for which the timeline view and/or mini-map view is being requested.

At block 330, the session analysis service 210 of the back-end platform 204 may then receive the request for the timeline view and/or mini-map view that is sent by the software-provider client device 212A.

In turn, at block 332, the session analysis service 210 may retrieve certain information for the given runtime session of the given client application from the session data store 208 that is to be presented within the requested timeline view and/or mini-map view, which may include log information and associated contextual information, session-details information, and perhaps also analytics-events information. To accomplish this, the session analysis service 210 may utilize the identifying information for the given runtime session of the given client application session that is included in the received request to locate the relevant information for the given runtime session of the given client application within the session data store 208.

Then, at block 334, the session analysis service 210 may cause the software-provider client device 212A to present the retrieved information for the given runtime session of the given client application (e.g., log information and associated contextual information) in the form of a timeline view and/or mini-map view for the given runtime session of the given client application. To accomplish this, the session analysis service 210 may transmit a response to the software-provider client device 212A that comprises instructions and data for constructing the timeline view and/or mini-map view for the given runtime session of the given client application. In practice, this response may take the form of one or more response messages (e.g., one or more HTTP messages) that are sent over the respective communication path between the back-end platform 204 and the software-provider client device 212A, and in at least some implementations, the one or more response messages may be sent via an API. However, the session analysis service's response may take other forms as well.

At block 340, the software-provider client device 212A may receive the response from the session analysis service 210 and then present the retrieved information for the given runtime session of the given client application (e.g., log information and associated contextual information) in the form of a timeline view and/or the mini-map view for the given runtime session of the given client application. In this respect, the timeline view and/or the mini-map view that is presented by the software-provider client device 212A may take any of the various forms that are described herein.

For instance, in line with the discussion above, the timeline view may comprise a time-sorted listing of respective line items for log events that were recorded during the given runtime session of the given client application, where each log event's respective line item in the time-sorted listing includes some or all of (i) timing information for the log event (e.g., a date and time when the log event was recorded), (ii) a category icon for the log event that indicates the log event's category, (iii) a textual descriptor of the log event, (iv) a set of contextual information associated with the log event, which may comprise a set of icons that indicate values for contextual attributes such as network connection state, application state, and/or networking library, among other possibilities, and (v) event details information that comprises additional details regarding the log event. (Along similar lines, the timeline view may also include line items for other types of events). Further, in line with the discussion above, the mini-map view may comprise an at-a-glance visualization of the volume of certain categories of log events that were recorded over the course of the given runtime session of the given client application.

After the software-provider client device 212A presents the retrieved information for the given runtime session of the given client application in the form of the timeline view and/or the mini-map view for the given runtime session of the given client application, the user of the software-provider client device 212A may then review and interact with the timeline view and/or the mini-map view in order to analyze the given runtime session of the given client application.

The disclosed timeline and mini-map views will now be described in further detail with respect to FIGS. 4A-B and 5A-C.

Figure 4A:
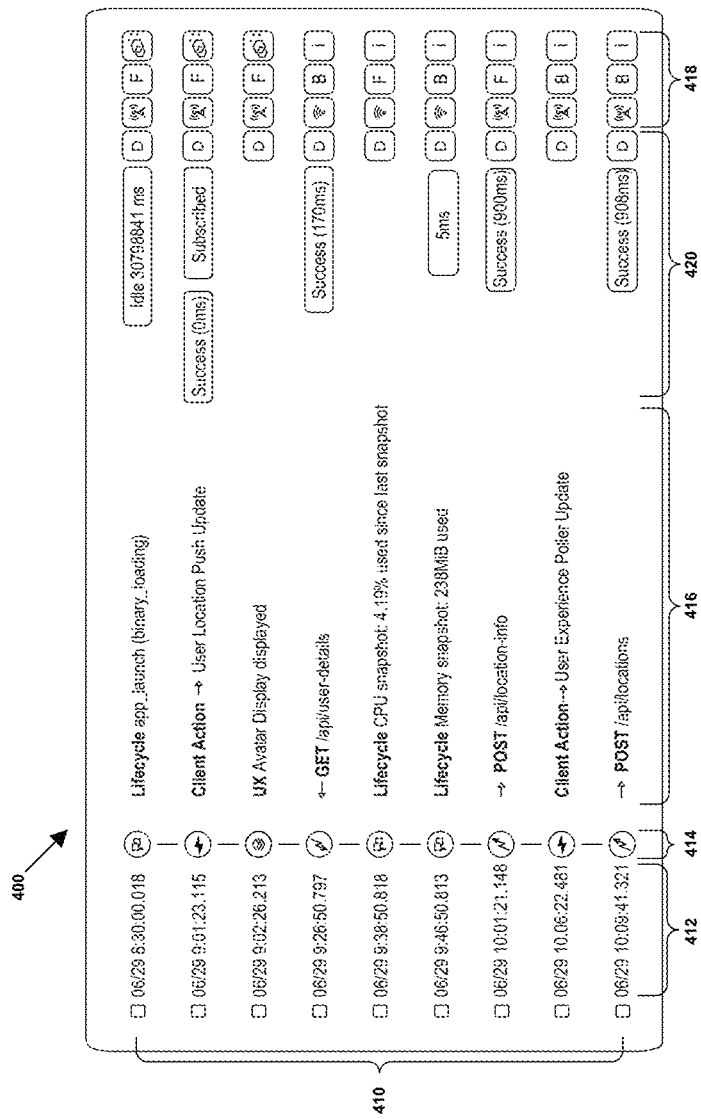
FIG. 4A is a diagram that illustrates one representative example of a timeline view that may be constructed and presented in accordance with the disclosed technology.

Starting with FIG. 4A, one representative example 400 of a timeline view that may be constructed and presented in accordance with the present disclosure is illustrated. As shown, this example timeline view 400 has a comparable form to that of the example timeline view 106 of FIG. 1 and also includes comparable line items to the ones included the example timeline view 106 of FIG. 1, although the example timeline view 400 of FIG. 4 includes three additional line items that were not shown in the example timeline view 106 of FIG. 1. In this respect, as with the example timeline view 106 of FIG. 1, the example timeline view 400 presents log events that were recorded during the given runtime session in the form of a scrollable, time-sorted listing 410 of respective line items for the log events, where each log event's respective line item in the scrollable time-sorted listing 410 includes (i) timing information 412 for the log event (e.g., a date and time when the log event was recorded), (ii) a category icon 414 for the log event that indicates the log event's category, (iii) a textual descriptor 416 of the log event, (iv) a set of contextual information 418 associated with the log event, which may comprise a set of icons that indicate values for contextual attributes such as network connection state, application state, and/or networking library, among other possibilities, and perhaps also (v) event details information 420 that comprises additional details regarding the log event. Additionally, each of the log event's line items in the scrollable, time-sorted listing 410 is also shown to include a selectable element (e.g., a checkbox) that enables a user to select a line item for purposes of highlighting and/or taking other actions with respect to the log event.

Figure 4B:
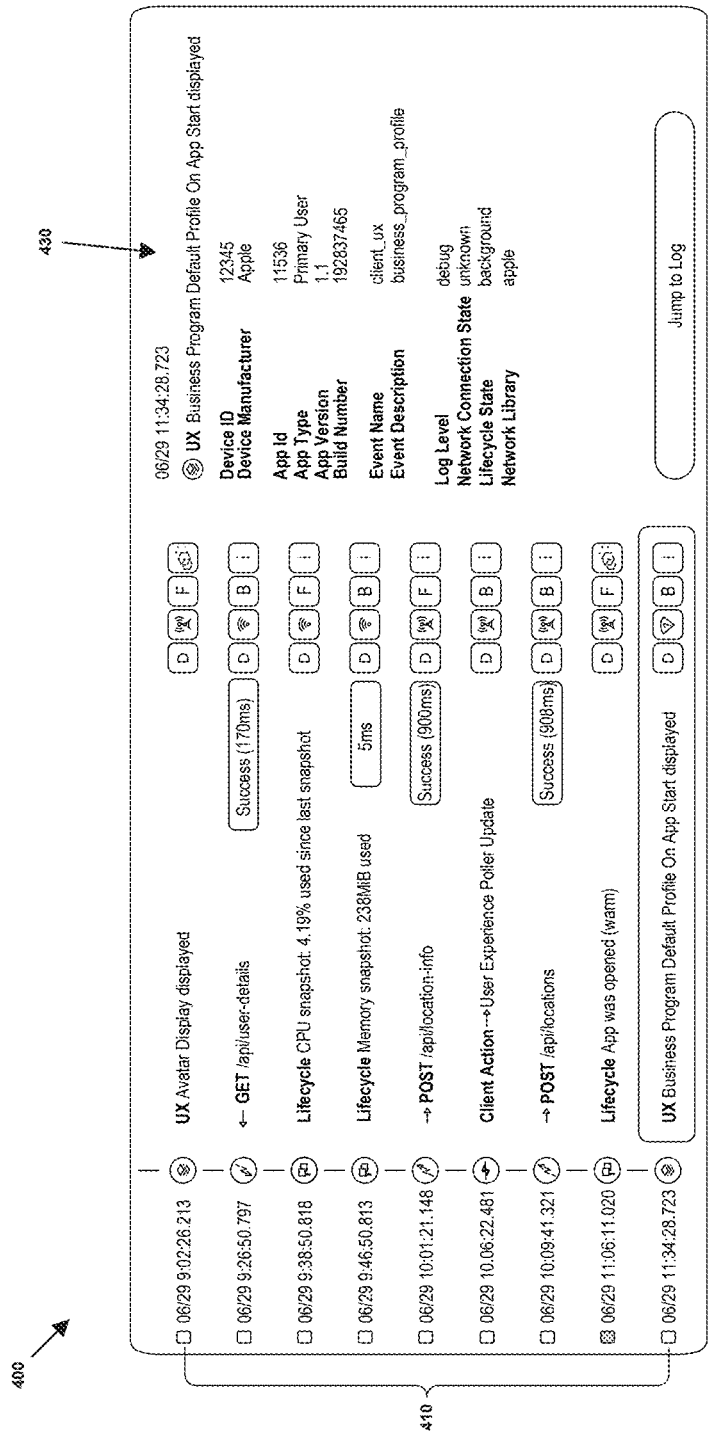
FIG. 4B is a diagram that illustrates another representative example of a timeline view that may be constructed and presented in accordance with the disclosed technology.

Turning now to FIG. 4B, the example timeline view 400 is shown at a different time, after a user has interacted with that example timeline view 400.

For instance, as shown in FIG. 4B, the example timeline view's scrollable time-sorted listing 410 has been "scrolled down" by a user such that the topmost two line items that were shown in FIG. 4A (i.e., the line items for the Lifecyle log event at 8:30:00.018 and the Client Action log event at 9:01:23.115) are no longer shown, the line item that was third from the top in FIG. 4A (i.e., the line item for the UX log event at 9:03:26.213) is now shown as the topmost line item in FIG. 4B, and two additional line items are now shown on the bottom of the example timeline view 400.

Further, as shown in FIG. 4B, the selectable element for one of the log events within the example timeline view 400 has been utilized by a user to highlight that log event for future reference. This is illustrated by the gray shading shown within the selectable element for the log event at 11:06:11.020. As previously discussed, when a user (e.g., a software provider's personnel) highlights a line item in this manner, he or she may also be presented with the opportunity to create a note for the log event, for example via a pop-up window that may appear upon highlighting the log event via the selectable element, among other possibilities. In this way, the highlighting and note-taking capabilities of the disclosed timeline view may enable a user to more efficiently collaborate with other users.

Further yet, as shown in FIG. 4B, a details pane 430 has been accessed by a user for the log event at 11:34:28.723. The example timeline view 400 may enable a user to access such a details pane 430 for a log event in any of various manners, including but not limited to single or double clicking on the line item for a given log event for which the details pane 430 is to be accessed, which may responsively cause the client device to update the example timeline view 400 to show the details pane 430 for the given log event. Further, while the given log event is being shown in the details pane 430, the example timeline view 400 may include some visual indication to reflect which log event is being shown within the details pane 430, such as by encircling the textual descriptor 416, the contextual information 418, and the event details information 420 (if any) of the log event's line item.

The details pane 430 may present any of various types of information for the given log event. As examples, the details pane 430 may include information about the client device that recorded the log event (e.g., Device ID, Device Manufacturer, etc.), information about the given client application (e.g., App ID, App Type, App Version, Build Number, etc.), information about the log event (e.g., Event Name, Event Description, etc.), and/or contextual information associated with the log event (e.g., log level, network connection state, application state, networking library, etc.), among various other types of information that may be presented within the details pane 430 for the given log event.

In the implementation shown in FIG. 4B, the details pane 430 is presented on the right side of the time-sorted listing 410, but it should be understood that in other implementations, the details pane 430 could be presented in-line within time-sorted listing 410 as an expansion of the line item for the given log event, among other possibilities. Additionally, although not shown in FIG. 4B, the details pane 430 may include a selectable button enabling a user to close the details pane 420 by selecting the button.

Although not shown in FIGS. 4A-B, the example timeline view 400 may also include a filtering feature that enables a user to narrow the universe of log events that are displayed within the example timeline view 400 based on any of various factors, examples of which may include log event category, log event severity level, and/or one or more of the contextual attributes described above.

Figure 5A:
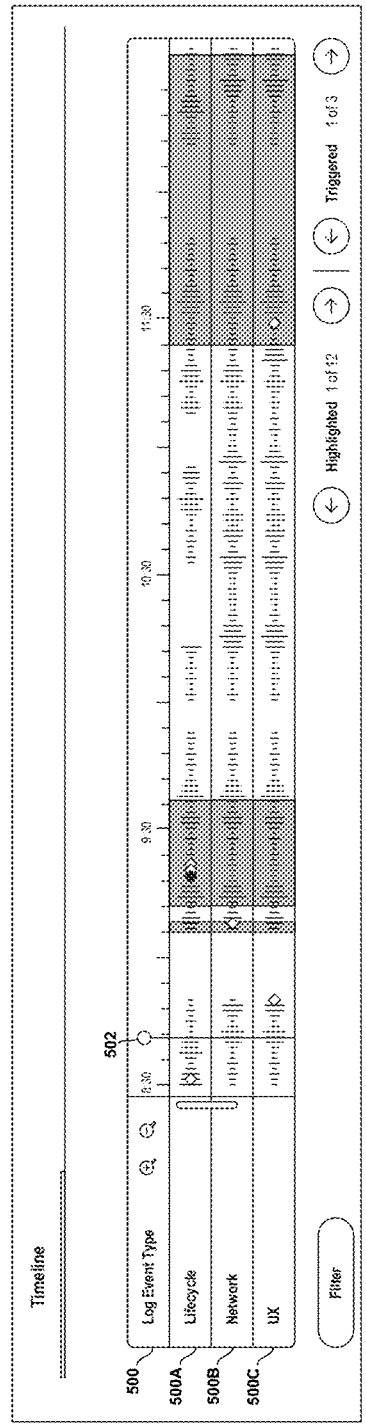
FIG. 5A is a diagram that illustrates a representative example of a mini-map view that may be constructed and presented in accordance with the disclosed technology.

Turning now to FIG. 5A, a representative example 500 of a mini-map view that may be constructed and presented in accordance with the present disclosure is illustrated. As shown, this example mini-map view 500 has a comparable form to that of the example mini-map view 108 of FIG. 1 and also includes log volume data similar to that included the example mini-map view 108 of FIG. 1. In this respect, as with the example mini-map view 108 of FIG. 1, the example mini-map view 500 is shown to include (i) a first two-dimensional plot 500A showing the volume of Lifecycle log events that were recorded over the course of the given runtime session of the given client application, (ii) a second two-dimensional plot 500B showing the volume of Network log events that were recorded over the course of the given runtime session of the given client application, and (iii) a third two-dimensional plot 500C showing the volume of UX log events that were recorded over the course of the given runtime session of the given client application, where a vertical dimension of each of the two-dimensional plots 500A-C represents a volume of log events for the associated log event category and a horizontal dimension of each of the two-dimensional plots 500A-C represents the time within the runtime session. Additionally, these three two-dimensional plots 500A-C are shown to be "stacked" vertically on top of one another and aligned horizontally such that they share a common time axis, which is shown on the top of the example mini-map view 500.

The example mini-map view 500 may enable a user to interact with the mini-map view 500 in any of various ways.

As one possibility, the example mini-map view 500 may include zoom in and zoom out buttons that enable a user to change the time resolution of the common time axis for the two-dimensional plots 500A-C.

As another possibility, the example mini-map view 500 may include a "scrubber" element 502 that a user can select and drag along the horizontal dimension of the two-dimensional plots to navigate through the timeline of the given runtime session being presented. In FIG. 5A, this scrubber element 502 is shown as a circular head with a vertical line that descends through the stack of two-dimensional plots 500A-C. Further, in a scenario where the example mini-map view 500 is presented together with a timeline view (e.g., as shown in FIG. 1), the scrubber element 502 may be tied to the timeline view's scrollable time-sorted listing of line items, such that (i) when the positioning of the scrubber element 502 is changed to a different point within the given runtime session, the timeline view automatically scrolls its time-sorted listing of line items to that point within the given runtime session, and (ii) when the timeline view's scrollable time-sorted listing of line items is scrolled by a user to show line items for a different point within the given runtime session, the example mini-map view 500 automatically updates the positioning of the scrubber element 502 to place it at a position corresponding to that point within the given runtime session.

As yet another possibility, the example mini-map view 500 may include selectable visual indicators for certain events of interest that occurred during the given runtime session of the given client application (e.g., log events that have been highlighted via a timeline view, trigger events detected on the client device where the given runtime session took place, etc.), which may enable a user to interact with the example mini-map view 500 in various ways. For instance, the example mini-map view 500 may also provide a user with the ability to view further information about a given event of interest by hovering over the event indicator for the given event.

Figure 5B:
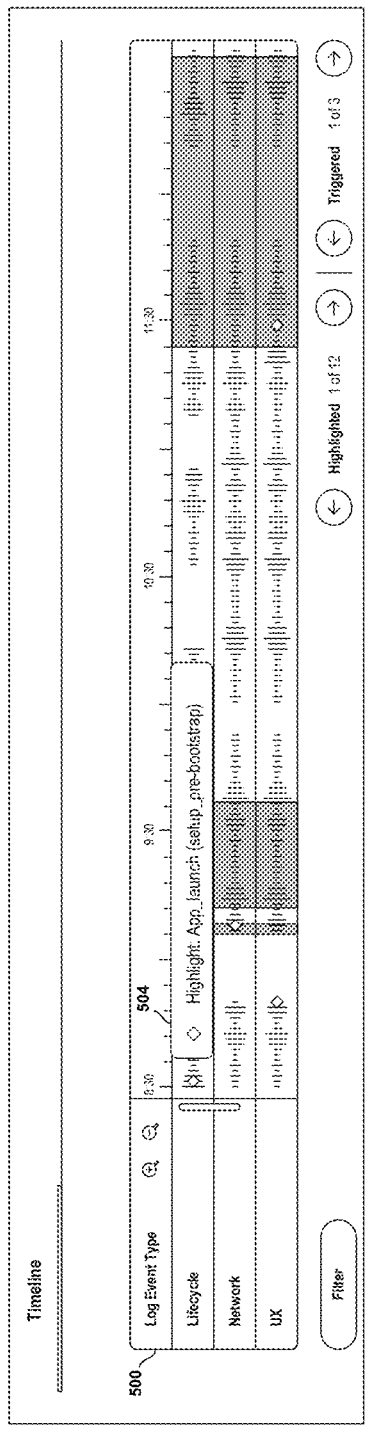
FIG. 5B is a diagram that illustrates another representative example of a mini-map view that may be constructed and presented in accordance with the disclosed technology.

FIG. 5B illustrates one possible example of this feature. In the example shown in FIG. 5B, when a user hovers over the event indicator for the highlighted lifecycle event that appears shortly after the 8:30 marker on the timeline, the example mini-map view 500 may present a pop-up window 504 that includes the textual descriptor "Highlight: App_launch (setup_pre-bootstrap)," which indicates that the visual indicator represents a highlighted lifecycle event related to launching the given client application.

Further, in a scenario where the example mini-map view 500 is presented together with a timeline view (e.g., as shown in FIG. 1), the example mini-map view's event indicators may be linked to the timeline view such that when a user selects a given event indicator within the example mini-map view 500 (by single or double clicking the event indicator), the timeline view may automatically scroll its time-sorted listing of line items to the point within the given runtime session when the selected event occurred.

Further yet, the example mini-map view 500 may include selectable elements that enable a user to click through the events of interest one-by-one. For example, as shown in FIGS. 5A-5B, the example mini-map view 500 may include a first set of selectable arrows for highlighted events and a second set of selectable arrows for trigger events, which may enable a user to click through these types of events one-by-one (and may in turn cause the timeline view's time-sorted listing of line items to automatically update to reflect the selected event).

Figure 5C:
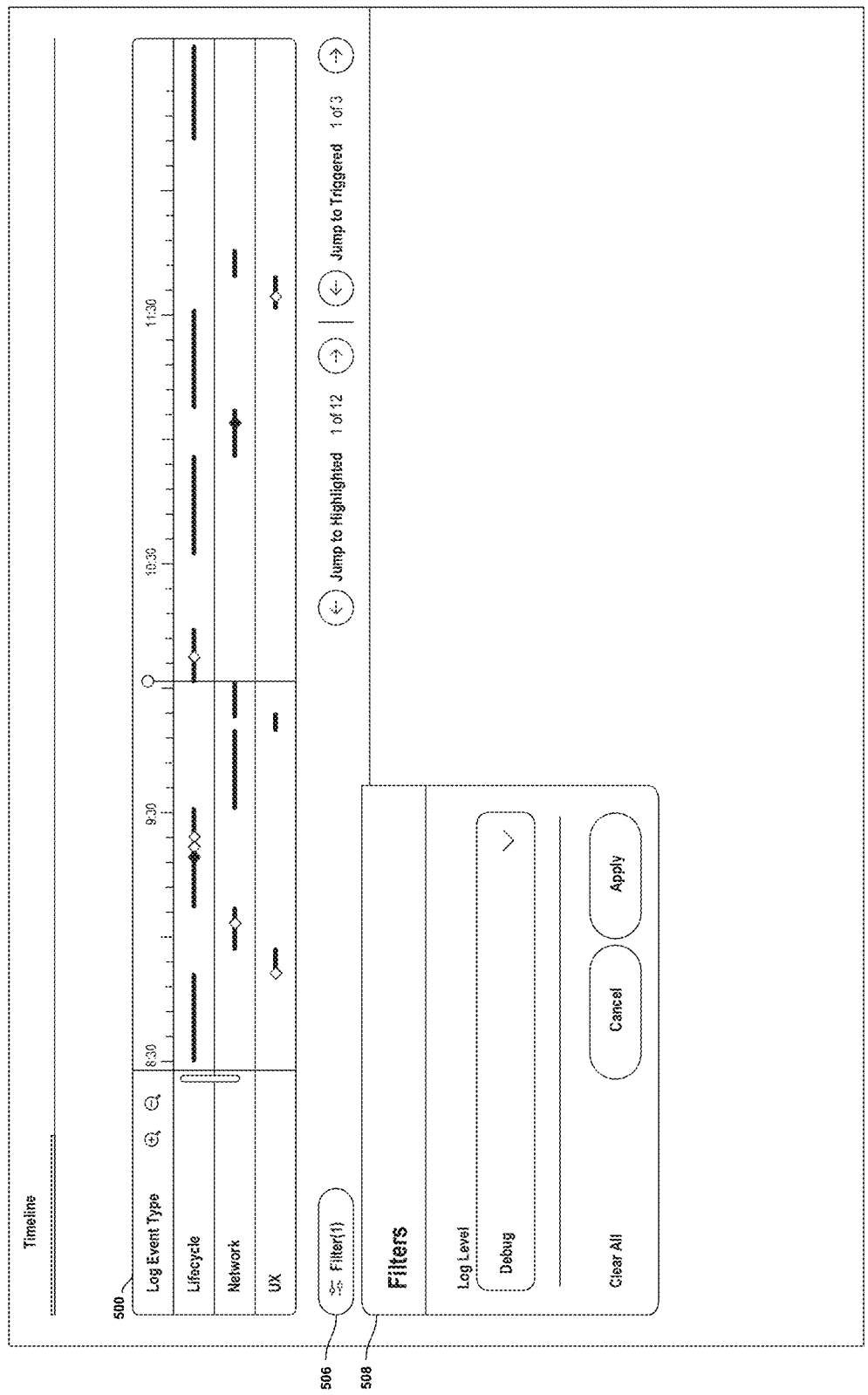
FIG. 5C is a diagram that illustrates another representative example of a mini-map view that may be constructed and presented in accordance with the disclosed technology.

As still another possibility, the example mini-map view 500 may include a filtering feature that enables a user to narrow the universe of log events that are represented within the example mini-map view 500. FIG. 5C illustrates one possible example of how such a filtering feature may be utilized in connection with the example mini-map view 500.

As shown in FIG. 5C, the example mini-map view 500 may include a selectable "Filter" button 506 which may also include a description of how many filters are active at any given time. When selected, a "Filters" popup window 508 may appear that provides a user with the ability to select filters to apply to the example mini-map view 500. For instance, in the illustrated example shown in FIG. 5C, "Filters" popup window 508 includes an option for filtering based on Log Level, which includes a dropdown menu that enables a user to select which log level(s) to select for filtering, and the user in this example has selected the log level "Debug" to use for the filtering. Based on the user's selection of this log level within the "Filters" popup window 508, the example mini-map view 500 has been updated to show only the log events for log events having severity levels of DEBUG, at the exclusion of log events for any other log events.

While the example "Filters" popup window 508 in FIG. 5C is shown to include an option for filtering based on Log Level, it should be understood that the "Filters" popup window 508 could provide options for filtering based on various other factors as well, including but not limited to filtering based on certain of the contextual attributes described above.

The disclosed timeline and mini-map views may include various other features and/or take various other forms as well.

Figure 6:
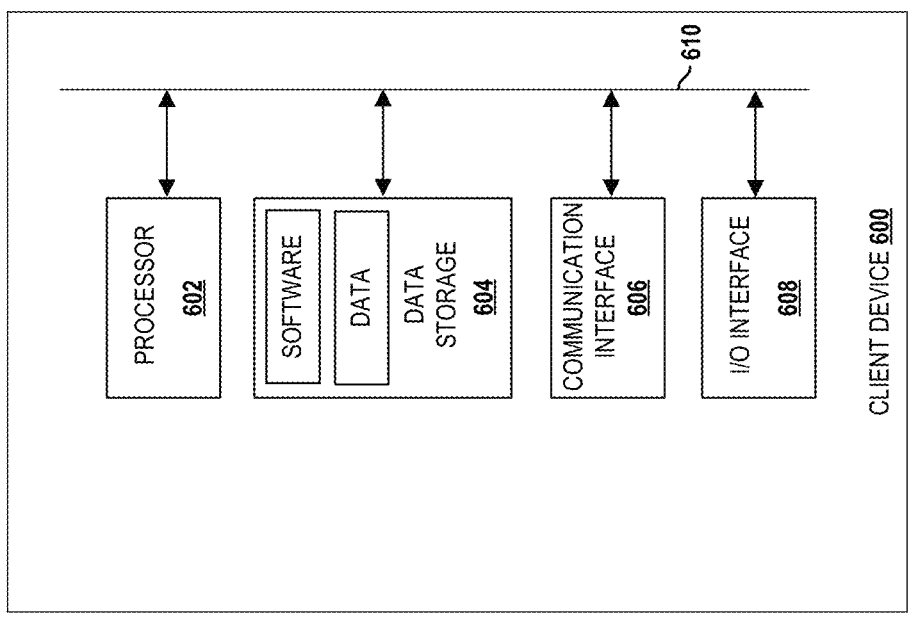
FIG. 6 is a simplified block diagram that illustrates some structural components that may be included in an example client device.

Turning now to FIG. 6, a simplified block diagram is provided to illustrate some structural components that may be included in an example client device 600, which may be configured to carry out any of the various functions disclosed herein. At a high level, client device 600 may include one or more processors 602, data storage 604, one or more communication interfaces 606, and an input/output (I/O) interface 608, all of which may be communicatively linked by a communication link 610 that may that various forms, one example of which is a system bus.

The one or more processors 602 of client device 600 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

In turn, data storage 604 of client device 600 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 602 of the client device 600 such that the client device 600 is configured to perform any of the various client-device functions disclosed herein (e.g., the functionality described above with reference to the end-user client device 202A and/or the software-provider client device 212A), and (ii) data related to the disclosed client-device functionality.

The one or more communication interfaces 608 of client device 600 may take the form of any one or more interfaces that facilitate wireless and/or wired communication with other computing devices or systems, including but not limited to the back-end platform 204 of FIGS. 2-3. Each such communication interface 608 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

The I/O interface 608 may generally take the form of (i) one or more input interfaces that are configured to receive and/or capture information at the client device 600 and (ii) one or more output interfaces that are configured to output information from client device 600 (e.g., for presentation to a user). In this respect, the one or more input interfaces of I/O interface 608 may include or provide connectivity to input components such as a microphone, a camera, a keyboard, a mouse, a trackpad, a touchscreen, and/or a stylus, among other possibilities. In turn, the one or more output interfaces of I/O interface 608 may include or provide connectivity to output components such as a display screen and/or an audio speaker, among other possibilities.

It should be understood that the client device 600 is one example of a client device that may be used with the example embodiments described herein. Numerous other arrangements are possible and contemplated herein. For instance, in other embodiments, the client device 600 may include additional components not pictured and/or more or fewer of the pictured components.

Figure 7:
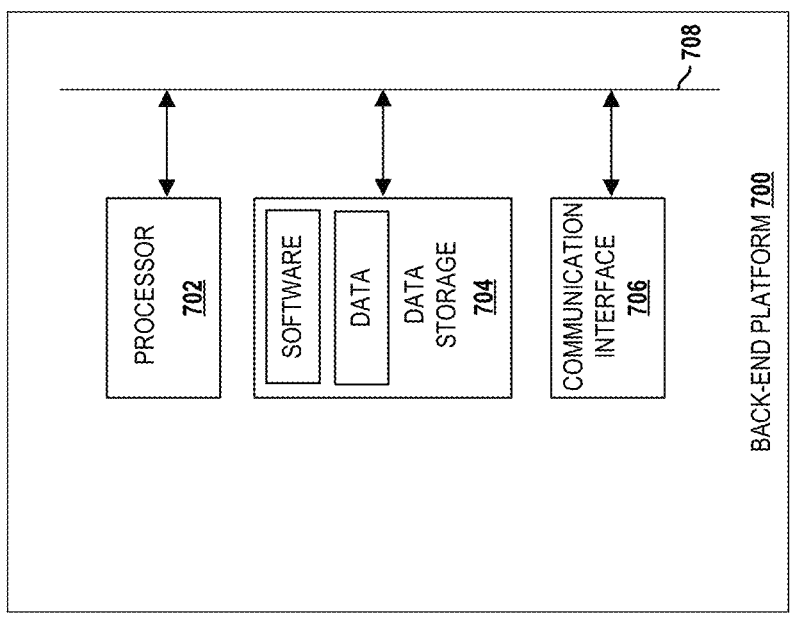
FIG. 7 is a simplified block diagram that illustrates some structural components that may be included in an example back-end platform.

Turning now to FIG. 7, a simplified block diagram is provided to illustrate some structural components that may be included in an example back-end platform 700, which may be configured to carry out any of the various functions disclosed herein. At a high level, back-end platform 700 may generally comprise any one or more computing systems that collectively include one or more processors 702, data storage 704, and one or more communication interfaces 706, all of which may be communicatively linked by a communication link 708 that may take the form of a system bus, a communication network such as a public, private, or hybrid cloud, or some other connection mechanism. Each of these components may take various forms.

The one or more processors 702 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities. In line with the discussion above, it should also be understood that the one or more processors 702 could comprise processing components that are distributed across a plurality of physical computing systems connected via a network, such as a computing cluster of a public, private, or hybrid cloud.

In turn, the data storage 704 may comprise one or more non-transitory computer-readable storage mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 702 such that the back-end platform 700 is configured to perform any of the various back-end platform functions disclosed herein, and (ii) data related to the disclosed back-end platform functionality. In line with the discussion above, it should also be understood that the data storage 704 may comprise computer-readable storage mediums that are distributed across a plurality of physical computing systems connected via a network, such as a storage cluster of a public, private, or hybrid cloud that operates according to technologies such as AWS for Elastic Compute Cloud, Simple Storage Service, etc.

The one or more communication interface 706 may take the form of any one or more interfaces that facilitate wireless and/or wired communication with other computing devices or systems, including but not limited to the client devices 202 and 212 of FIGS. 2-3. Each such communication interface 708 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

Although not shown, the back-end platform 700 may additionally include an I/O interface that facilitates user interaction with the back-end platform 700.

It should be understood that the back-end platform 700 is one example of a back-end platform that may be used with the embodiments described herein. Numerous other arrangements are possible and contemplated herein. For instance, other back-end platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users," or other entities, this is for purposes of example and explanation only. The claims should not be construed as requiring action by such actors unless explicitly recited in the claim language.

We claim:

1. A method implemented by a computing platform, the method comprising:
   receiving, from a first client device installed with a given client application via a first network-based communication path between the computing platform and the first client device, (i) log information for a set of log events recorded by the first client device during a given runtime session of the given client application and (ii) associated contextual information for the given runtime session of the given client application comprising at least (a) data indicating a network connection state of the first client device during the given runtime session of the given client application and (b) data indicating whether the given client application was in a background or a foreground of the first client device during the given runtime session of the given client application;
   storing the log information and associated contextual information for the given runtime session of the given client application;
   receiving, from a second client device via a second network-based communication path between the computing platform and the second client device, a request to access a visualization of the given runtime session of the given client application, wherein the request is based on user input to the second client device;
   after receiving the request:
      retrieving at least a subset of the stored log information and associated contextual information for the given runtime session of the given client application; and
      based on the retrieved subset of the stored log information and associated contextual information for the given runtime session of the given client application, causing the second client device to present:
         (1) a timeline graphical user interface (GUI) view for the given runtime session of the given client application, the timeline GUI view comprising a vertically-aligned, scrollable, time-sorted listing of selectable line items for log events in the set of log events, wherein, for each respective log event, the selectable line item includes at least (i) a respective time value for the respective log event, (ii) a respective graphical indicator of a log-event category of the respective log event, (iii) a respective textual descriptor for the respective log event, (iv) a respective graphical indicator of a network connection state of the first client device when the respective log event was recorded, and (v) a respective graphical indicator of whether the given client application was in the foreground or the background of the first client device when the respective log event was recorded, and wherein:
            the respective time values across the selectable line items are aligned vertically in a first column, the respective graphical indicators of the log-event category across the selectable line items are aligned vertically in a second column and have different visual appearances for different log-event categories such that changes in the log-event category between consecutive log events are indicated by a change in visual appearance of the graphical indicators of the log-event category for the consecutive log events, the respective textual descriptors across the selectable line items are aligned vertically in a third column, the respective graphical indicators of the network connection state of the first client device across the selectable line items are aligned vertically in a fourth column and have different visual appearances for different network connection states such that changes in the network connection state between consecutive log events are indicated by a change in visual appearance of the graphical indicators of the network connection state for the consecutive log events, and the respective graphical indicators of whether the given client application was in the foreground or the background of the first client device across the selectable line items are aligned vertically in a fifth column and have different visual appearances for foreground versus background such that changes in whether the given client application was in the foreground or the background between consecutive log events are indicated by a change in visual appearance of the graphical indicators of whether the given client application was in the foreground or the background for the consecutive log events; and (2) a mini-map GUI view for the given runtime session of the given client application, the mini-map GUI view comprising:

(i) a two-dimensional visualization of respective volumes of two or more log-event categories of log events that were recorded at different times during the given runtime session, wherein a vertical dimension of the two-dimensional visualization represents the two or more log-event categories for which the respective volumes are shown and a horizontal dimension represents the different times during the given runtime session at which the respective volumes of the two or more log-event categories are shown, and wherein, at each point within the two-dimensional visualization that represents an intersection between a given log-event category of the two or more log-event categories and a given time during the given runtime session, a given volume level of log events of the given log-event category that were recorded at the given time is indicated; and (ii) a GUI element that is linked to the timeline GUI view such that (a) when the GUI element is moved by a user horizontally along the two-dimensional visualization to a first position that corresponds to a first given time within the given runtime session, the timeline GUI view's time-sorted listing of selectable line items automatically scrolls vertically to show a first line item that corresponds with the first given time within the given runtime session and (b) when the timeline GUI view's scrollable, time-sorted listing of selectable line items is scrolled vertically by the user to show a second line item that corresponds with a second given time within the given runtime session, the GUI element automatically moves horizontally within the two-dimensional visualization to a second position that corresponds with the second given time within the given runtime session;

after the timeline GUI view has been updated to show a given subset of selectable line items from the scrollable, time-sorted listing of selectable line items responsive to either the GUI element of the mini-map GUI view being moved horizontally by a user of the second client device or the scrollable time-sorted listing of selectable line items of the timeline GUI view being scrolled vertically by the user of the second client device, receiving, from the second client device via the second network-based communication path, an indication of a user selection of a given selectable line item from the given subset of selectable line items for a given log event in the set of log events; and in response to receiving the indication of the user selection, causing the second client device to present a details pane that shows further details about the given log event.

2. The method of claim 1, wherein, for each respective log event, the selectable line item further includes (vi) a respective indicator of a networking library being utilized by the given client application when the respective log event was recorded; and wherein the respective indicators of the networking library across the selectable line items are aligned vertically in a sixth column.

3. The method of claim 1, wherein, within the selectable line item for each respective log event, the respective textual descriptor for the respective log event comprises a label indicating a category of the respective log event.

4. The method of claim 1, wherein, within the selectable line item for each respective log event, the respective textual descriptor for the respective log event comprises a descriptive phrase that provides a preview of the respective log event.

5. The method of claim 1, wherein, within the selectable line item for each respective log event, the respective textual descriptor for the respective log event is color-coded in accordance with a category of the respective log event.

6. The method of claim 1, wherein:

the selectable line item for each respective log event further includes (vi) an indication of a severity level of the respective log event; and the respective indicators of the severity level across the selectable line items are aligned vertically in a sixth column.

7. The method of claim 1, wherein the selectable line item for each respective log event in at least a subset of the set of log events further includes (vi) a duration of the respective log event.

8. The method of claim 1, wherein the selectable line item for each respective log event in at least a subset of the set of log events further includes (vi) an indication of whether the respective log event resulted in success or failure.

9. The method of claim 1, wherein causing the second client device to present the timeline GUI view for the given runtime session of the given client application comprises:

transmitting, to the second client device via the second network-based communication path, a response to the request that comprises instructions and data for constructing the timeline GUI view.

10. The method of claim 1, wherein the log information and associated contextual information are encoded together within the set of log entries.

11. The method of claim 1, wherein, within the selectable line item for each respective log event, (i) the respective indicator of the network connection state of the first client device is color-coded such that a color of the respective indicator of the network connection state of the first client device changes depending on a value of the network connection state of the first client device when the respective log event was recorded, and (ii) the respective indicator of whether the given client application was in the foreground or the background of the first client device is color-coded such that a color of the respective indicator of whether the given client application was in the foreground or the background of the first client device changes depending on whether the given client application was in the foreground or the background of the first client device when the respective log event was recorded.

12. The method of claim 1, wherein the log information for the set of log events recorded by the first client device during the given runtime session of the given client application comprises log information for at least 5,000 log events recorded by the first client device during the given runtime session of the given client application.

13. The method of claim 1, wherein, within the selectable line item for each respective log event, the respective textual descriptor for the respective log event is color-coded according to the log-event category of the respective log event such that changes in the log-event category between consecutive log events are indicated by a change in visual appearance of a color of the respective textual descriptors for the consecutive log events.

14. The method of claim 1, further comprising:
after causing the second client device to present the timeline GUI view, receiving, from the second client device via the second network-based communication path, an indication of user input designating a particular selectable line item from the listing of selectable line items presented in the timeline GUI view as corresponding to an event of interest; and
based on the received indication of user input designating the particular selectable line item, causing the second client device to present within the mini-map GUI view an interactive indicator corresponding to the particular selectable line item.

15. The method of claim 14, wherein a hover input over the interactive indicator presented within the mini-map GUI view causes the mini-map GUI view to present a textual descriptor corresponding to the event of interest.

16. A non-transitory computer-readable medium comprising program instructions stored thereon that are executable to cause a computing platform to perform functions comprising:
receiving, from a first client device installed with a given client application via a first network-based communication path between the computing platform and the first client device, (i) log information for a set of log events recorded by the first client device during a given runtime session of the given client application and (ii) associated contextual information for the given runtime session of the given client application comprising at least (a) data indicating a network connection state of the first client device during the given runtime session of the given client application and (b) data indicating whether the given client application was in a background or a foreground of the first client device during the given runtime session of the given client application;
storing the log information and associated contextual information for the given runtime session of the given client application;
receiving, from a second client device via a second network-based communication path between the computing platform and the second client device, a request to access a visualization of the given runtime session of the given client application, wherein the request is based on user input to the second client device;
after receiving the request:
retrieving at least a subset of the stored log information and associated contextual information for the given runtime session of the given client application; and
based on the retrieved subset of the stored log information and associated contextual information for the given runtime session of the given client application, causing the second client device to present:
(1) a timeline graphical user interface (GUI) view for the given runtime session of the given client application, the timeline GUI view comprising a vertically-aligned, scrollable, time-sorted listing of selectable line items for log events in the set of log events, wherein, for each respective log event, the selectable line item includes at least (i) a respective time value for the respective log event, (ii) a respective graphical indicator of a log-event category of the respective log event, (iii) a respective textual descriptor for the respective log event, (iv) a respective graphical indicator of a network connection state of the first client device when the respective log event was recorded, and (v) a respective graphical indicator of whether the given client application was in the foreground or the background of the first client device when the respective log event was recorded, and wherein:
the respective time values across the selectable line items are aligned vertically in a first column,
the respective graphical indicators of the log-event category across the selectable line items are aligned vertically in a second column and have different visual appearances for different log-event categories such that changes in the log-event category between consecutive log events are indicated by a change in visual appearance of the graphical indicators of the log-event category for the consecutive log events,
the respective textual descriptors across the selectable line items are aligned vertically in a third column,
the respective graphical indicators of the network connection state of the first client device across the selectable line items are aligned vertically in a fourth column and have different visual appearances for different network connection states such that changes in the network connection state between consecutive log events are indicated by a change in visual appearance of the graphical indicators of the network connection state for the consecutive log events, and
the respective graphical indicators of whether the given client application was in the foreground or the background of the first client device across the selectable line items are aligned vertically in a fifth column and have different visual appearances for foreground versus background such that changes in whether the given client application was in the foreground or the background between consecutive log events are indicated by a change in visual appearance of the graphical indicators of whether the given client application was in the foreground or the background for the consecutive log events; and (2) a mini-map GUI view for the given runtime session of the given client application, the mini-map GUI view comprising:

(i) a two-dimensional visualization of respective volumes of two or more log-event categories of log events that were recorded at different times during the given runtime session, wherein a vertical dimension of the two-dimensional visualization represents the two or more log-event categories for which the respective volumes are shown and a horizontal dimension represents the different times during the given runtime session at which the respective volumes of the two or more log-event categories are shown, and wherein, at each point within the two-dimensional visualization that represents an intersection between a given log-event category of the two or more log-event categories and a given time during the given runtime session, a given volume level of log events of the given log-event category that were recorded at the given time is indicated; and (ii) a GUI element that is linked to the timeline GUI view such that (a) when the GUI element is moved by a user horizontally along the two-dimensional visualization to a first position that corresponds to a first given time within the given runtime session, the timeline GUI view's time-sorted listing of selectable line items automatically scrolls vertically to show a first line item that corresponds with the first given time within the given runtime session and (b) when the timeline GUI view's scrollable, time-sorted listing of selectable line items is scrolled vertically by the user to show a second line item that corresponds with a second given time within the given runtime session, the GUI element automatically moves horizontally within the two-dimensional visualization to a second position that corresponds with the second given time within the given runtime session;

after the timeline GUI view has been updated to show a given subset of selectable line items from the scrollable, time-sorted listing of selectable line items responsive to either the GUI element of the mini-map GUI view being moved horizontally by a user of the second client device or the scrollable time-sorted listing of selectable line items of the timeline GUI view being scrolled vertically by the user of the second client device, receiving, from the second client device via the second network-based communication path, an indication of a user selection of a given selectable line item from the given subset of selectable line items for a given log event in the set of log events; and in response to receiving the indication of the user selection, causing the second client device to present a details pane that shows further details about the given log event.

17. The non-transitory computer-readable medium of claim 16, wherein, for each respective log event, the selectable line item further includes (vi) a respective indicator of a networking library being utilized by the given client application when the respective log event was recorded; and wherein the respective indicators of the networking library across the selectable line items are aligned vertically in a sixth column.

18. The non-transitory computer-readable medium of claim 16, wherein, within the selectable line item for each respective log event, the respective textual descriptor for the respective log event is color-coded in accordance with a category of the respective log event.

19. The non-transitory computer-readable medium of claim 16, wherein, within the selectable line item for each respective log event, (i) the respective indicator of the network connection state of the first client device is color-coded such that a color of the respective indicator of the network connection state of the first client device changes depending on a value of the network connection state of the first client device when the respective log event was recorded, and (ii) the respective indicator of whether the given client application was in the foreground or the background of the first client device is color-coded such that a color of the respective indicator of whether the given client application was in the foreground or the background of the first client device changes depending on whether the given client application was in the foreground or the background of the first client device when the respective log event was recorded.

20. A computing platform, comprising:
at least one processor;
at least one non-transitory computer-readable medium; and
program instructions stored on the at least one non-transitory computer-readable medium that are executable by the at least one processor such that the computing platform is configured to:
receive, from a first client device installed with a given client application via a first network-based communication path between the computing platform and the first client device, (i) log information for a set of log events recorded by the first client device during a given runtime session of the given client application and (ii) associated contextual information for the given runtime session of the given client application comprising at least (a) data indicating a network connection state of the first client device during the given runtime session of the given client application and (b) data indicating whether the given client application was in a background or a foreground of the first client device during the given runtime session of the given client application;
store the log information and associated contextual information for the given runtime session of the given client application;
receive, from a second client device via a second network-based communication path between the computing platform and the second client device, a request to access a visualization of the given runtime session of the given client application, wherein the request is based on user input to the second client device;
after receiving the request:

retrieve at least a subset of the stored log information and associated contextual information for the given runtime session of the given client application; and based on the retrieved subset of the stored log information and associated contextual information for the given runtime session of the given client application, causing the second client device to present:

(1) a timeline graphical user interface (GUI) view for the given runtime session of the given client application, the timeline GUI view comprising a vertically-aligned, scrollable, time-sorted listing of selectable line items for log events in the set of log events, wherein, for each respective log event, the selectable line item includes at least (i) a respective time value for the respective log event, (ii) a respective graphical indicator of a log-event category of the respective log event, (iii) a respective textual descriptor for the respective log event, (iv) a respective graphical indicator of a network connection state of the first client device when the respective log event was recorded, and (v) a respective graphical indicator of whether the given client application was in the foreground or the background of the first client device when the respective log event was recorded, and wherein:

the respective time values across the selectable line items are aligned vertically in a first column, the respective graphical indicators of the log-event category across the selectable line items are aligned vertically in a second column and have different visual appearances for different log-event categories such that changes in the log-event category between consecutive log events are indicated by a change in visual appearance of the graphical indicators of the log-event category for the consecutive log events, the respective textual descriptors across the selectable line items are aligned vertically in a third column, the respective graphical indicators of the network connection state of the first client device across the selectable line items are aligned vertically in a fourth column and have different visual appearances for different network connection states such that changes in the network connection state between consecutive log events are indicated by a change in visual appearance of the graphical indicators of the network connection state for the consecutive log events, and the respective graphical indicators of whether the given client application was in the foreground or the background of the first client device across the selectable line items are aligned vertically in a fifth column and have different visual appearances for foreground versus background such that changes in whether the given client application was in the foreground or the background between consecutive log events are indicated by a change in visual appearance of the graphical indicators of whether the given client application was in the foreground or the background for the consecutive log events; and (2) a mini-map GUI view for the given runtime session of the given client application, the mini-map GUI view comprising:

(i) a two-dimensional visualization of respective volumes of two or more log-event categories of log events that were recorded at different times during the given runtime session, wherein a vertical dimension of the two-dimensional visualization represents the two or more log-event categories for which the respective volumes are shown and a horizontal dimension represents the different times during the given runtime session at which the respective volumes of the two or more log-event categories are shown, and wherein, at each point within the two-dimensional visualization that represents an intersection between a given log-event category of the two or more log-event categories and a given time during the given runtime session, a given volume level of log events of the given log-event category that were recorded at the given time is indicated; and (ii) a GUI element that is linked to the timeline GUI view such that (a) when the GUI element is moved by a user horizontally along the two-dimensional visualization to a first position that corresponds to a first given time within the given runtime session, the timeline GUI view's time-sorted listing of selectable line items automatically scrolls vertically to show a first line item that corresponds with the first given time within the given runtime session and (b) when the timeline GUI view's scrollable, time-sorted listing of selectable line items is scrolled vertically by the user to show a second line item that corresponds with a second given time within the given runtime session, the GUI element automatically moves horizontally within the two-dimensional visualization to a second position that corresponds with the second given time within the given runtime session;

after the timeline GUI view has been updated to show a given subset of selectable line items from the scrollable, time-sorted listing of selectable line items responsive to either the GUI element of the mini-map GUI view being moved horizontally by a user of the second client device or the scrollable time-sorted listing of selectable line items of the timeline GUI view being scrolled vertically by the user of the second client device, receive, from the second client device via the second network-based communication path, an indication of a user selection of a given selectable line item from the given subset of selectable line items for a given log event in the set of log events; and in response to receiving the indication of the user selection, cause the second client device to present a details pane that shows further details about the given log event.

* * * * *